United States Patent [19]

Yano

[11] 4,446,471

[45] May 1, 1984

[54] ELECTROSTATIC RECORDING METHOD AND APPARATUS THEREFOR

[75] Inventor: Takashi Yano, Tokyo, Japan

[73] Assignee: Ricoh Company, Ltd., Tokyo, Japan

[21] Appl. No.: 102,832

[22] Filed: Dec. 12, 1979

[30] Foreign Application Priority Data

Dec. 20, 1978 [JP] Japan ................................ 53-160643
May 29, 1979 [JP] Japan ................................ 54-66621

[51] Int. Cl.³ ............................................ G01D 15/06

[52] U.S. Cl. ................................ 346/153.1; 346/74.2; 355/3 TR; 355/3 TE

[58] Field of Search .................... 346/153.1, 155, 74.5, 346/160, 74.2; 355/3 CH, 3 TR, 3 TE, 7, 14 R

[56] References Cited

U.S. PATENT DOCUMENTS

| | | | |
|---|---|---|---|
| 3,551,146 | 12/1970 | Gundlach | 346/153.1 |
| 3,930,257 | 12/1975 | Quong | 346/153.1 |
| 4,087,828 | 5/1978 | Lind | 358/300 |
| 4,122,462 | 10/1978 | Hirayama | 358/300 |
| 4,142,192 | 2/1979 | Ochi | 346/74.2 |
| 4,251,152 | 2/1981 | Miyakawa | 355/3 CH |
| 4,268,164 | 5/1981 | Yajima | 355/7 |

*Primary Examiner*—Alan Faber
*Attorney, Agent, or Firm*—Guy W. Shoup; Gerard F. Dunne

[57] ABSTRACT

A recording method and apparatus therefor make the recording of images by the following process: A powder-like toner having a high electric resistivity and a charge retention property is held on a donor and is brought into contact with a multi-stylus electrode. A pattern signal is applied to the multi-stylus electrode and the toner is electrically charged or quenched by the charge injection of the multi-stylus electrode and a charge distribution is formed in the toner on the donor, corresponding to the pattern signal. The charge distribution is used for the formation of a visible image. For example, by transferring the toner selectively to a recording sheet in accordance with the charge distribution, a visible pattern corresponding to the pattern signal is obtained on the recording sheet. The visible pattern can be recorded on an electrically conductive recording member or a recording member having uneven surface by utilizing an image transfer medium. By transferring toner to a latent image bearing member on which a latent electrostatic image is formed, a visible pattern modified by the pattern signal can be obtained.

42 Claims, 25 Drawing Figures

ELECTROSTATIC RECORDING METHOD AND APPARATUS THEREFOR

BACKGROUND OF THE INVENTION

The present invention relates to a novel recording method named LIST (Latent Image Injecting to Surface of Toner) method by the inventor of the present invention and apparatus therefor.

Conventionally, a recording method is known, which comprises the steps of applying a graphic signal to a multi-stylus electrode, bringing this electrode near a latent image bearing member to charge or quench the surface of a latent image bearing member to form a latent electrostatic image thereon corresponding to the graphic signal, developing the latent electrostatic image by toner and transferring the developed image to a recording sheet. This method, however, has the following problem: The multi-stylus electrode is in contact with or in close proximity to the latent image bearing member and therefore, if some residual toner adheres to the multi-stylus electrode after image transfer, the toner has an adverse effect on the next recording image. Therefore, it is required to clean the latent image bearing member sufficiently after a visible image has been transferred. However, from the viewpoint of the life of the latent image bearing member, it is difficult to clean the multi-stylus electrode sufficiently.

As a method capable of avoiding the above-mentioned problem, the following method has been proposed: In the method, a counter electrode whose surface is covered with toner, called donor, is disposed so as to face a multi-stylus electrode with a small gap therebetween and a graphic signal is applied to the multi-stylus electrode, while a recording sheet is caused to run between the donor and the multi-stylus electrode, so that electric field passing through the recording sheet is locally generated in accordance with the graphic signal and the toner on the donor is transferred to the surface of the recording sheet by the action of the electric field, whereby a visible image corresponding to the graphic signal is formed on the recording sheet. According to this method, since the recording sheet exists between the donor and the multi-stylus electrode, the multi-stylus electrode is not smeared by the toner. However, the multi-stylus electrode is disposed on the back side of the recording sheet, and thus the clearness of a visible image is reduced as the thickness of the recording sheet increases. Furthermore, since discharging (generally spark discharge) is performed at the multi-stylus electrode, the multi-stylus electrode is corroded so that a long life of the multi-stylus electrode cannot be expected.

SUMMARY OF THE INVENTION

It is an object of the invention to provide a novel recording method which can avoid the shortcomings of the conventional recording methods and to provide apparatus for carrying out the novel method.

Another object of the invention is to provide a recording method capable of avoiding the conventional shortcomings and also capable of recording on an electrically conductive recording member and a recording member having an uneven surface, and to provide apparatus for carrying out the method.

A further object of the invention is to provide a novel recording method capable of modifying a latent electrostatic image formed on a latent image bearing member, by a desired pattern, and making the modified latent electrostatic image visible and recording the visible image, and to provide apparatus for carrying out the method.

In the invention, a multi-stylus electrode to which a pattern signal is applied is brought into contact with toner having a high electric resistivity and a charge retention property and a charge distribution corresponding to the pattern signal is formed in the toner on a donor, utilizing the charge injection into the toner by the multi-stylus electrode, and from the charge distribution is made a visible pattern.

The recording method according to the invention can be embodied in the form of an electrostatic printer, a manual writing format synthesis printer, a superpose printer and a masking copier.

As the toner for use in the invention, magnetic toner and non-magnetic toner of one-component type can be employed.

In order to electrically charge or quench the toner selectively, the multi-stylus electrode is employed, and in order to charge the toner uniformly, a doctor, a corona charger, a doctor for triboelectric charging and a charging roller can be employed.

As the latent image bearing member, a drum-like member or a sheet-like member can be employed. In an embodiment of the invention, the toner image obtained on the latent image bearing member is transferred to a recording sheet. However, when a sheet-like latent image bearing member is employed, the toner image on the sheet-like latent image bearing member can be directly fixed to the latent image bearing member for recording.

DETAILED DESCRIPTION OF THE PREFERRED EMBODIMENTS

Figure 1:
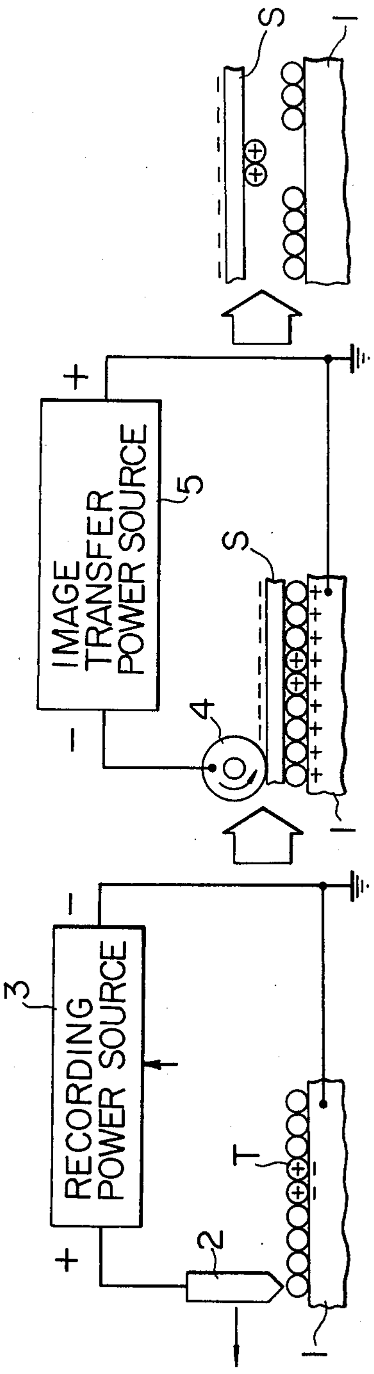
FIG. 1 shows diagrammatically an embodiment of a LIST recording process according to the invention.

Referring to FIG. 1, there is shown a most simple embodiment of a recording method according to the invention.

In FIG. 1, a donor represented by reference numeral 1 has to be electrically conductive at least at its surface. That the surface of the donor 1 is electrically conductive does not necessarily mean that the donor 1 is a good conductor of electricity. The surface of the donor 1 is covered uniformly with a thin layer of toner T having a high resistivity and a charge retention property. A multi-stylus electrode 2 formed as a thin and long plate-like member has its longitudinal side directed perpendicular to the plane of FIG. 1. In a narrow end surface in the longitudinal direction of the multi-stylus electrode 2, there are embedded a number of stylus electrodes in line in the longitudinal direction. Thus, in the narrow end surface of the multi-stylus electrode 2, the fine end portions of the stylus electrodes are arranged extremely close to each other in the longitudinal direction.

The end surface of the multi-stylus electrode 2 with the stylus electrodes embedded therein is in contact with the toner layer on the donor 1 and also is arranged so as to be movable relative to the toner layer. In FIG. 1, the arrow near the multi-stylus electrode 2 indicates the direction of the movement of the multi-stylus electrode 2 relative to the toner layer. In other words, the relative movement of the multi-stylus electrode 2 is performed in a direction normal to its longitudinal direction.

The toner layer can be formed on the donor 1 using an exclusive doctor or by moving the multi-stylus electrode 2 relative to the donor 1. Namely the multi-stylus electrode 2 can be used as a doctor.

When a pattern signal is applied to the recording electrode 2 while the toner layer on the donor 1 and the multi-stylus electrode 2 are relatively moved in one direction, a voltage is applied locally between the stylus electrodes of the multi-stylus electrode 2 and the donor 1 in accordance with the applied pattern signal, so that electric charges are injected into a portion of the toner layer which is in contact with the stylus electrodes. In FIG. 1, positive charges are injected into the toner layer.

Thus, the toner T on the donor 1 is selectively charged in accordance with the pattern signal so that a charged toner pattern corresponding to the pattern signal is formed on the surface of the donor 1.

A recording sheet S is superimposed on the layer of toner T having a charge pattern in accordance with the pattern signal and an image transfer roller 4 is charged to a negative polarity, which is opposite to the polarity of the charges injected into the toner T, by an image transfer power source 5 and the recording sheet S is then uniformly charged to a negative polarity by bringing the negatively charged image transfer roller 4 rotatably into contact with the back side of the recording sheet S, and the toner positively charged in accordance with the pattern signal is transferred to the contacting surface of the recording sheet S by the electric force of the negative charge applied to the recording sheet S. Therefore, when the recording sheet S is separated from the donor 1, a visible pattern corresponding to the pattern signal is obtained on the recording sheet S. According to the charge injection method, since the contact of the multi-stylus electrode 2 with the toner T is sufficiently maintained, spark discharge does not take place between the multi-stylus electrode 2 and the toner T so that the multi-stylus electrode 2 is not corroded.

The above-mentioned pattern signal includes the so-called image or graphic signal and has a broader meaning that the image signal. However, for the present explanatory purposes, it suffices to regard the pattern signal as the graphic signal. In the above-mentioned embodiment, a recorded image is obtained corresponding to an image signal on the recording sheet S. Therefore, the above-mentioned process can be employed in a recording process of received signals in facsimile apparatus and recording process of various types of printers or the like.

The charge retention property and the high electric resistivity which are required for the toner T for use in the invention will now be explained.

The charge retention property of the toner T signifies a property for the toner T into which electric charges are injected from the stylus electrodes to retain the injected charges for a definite period of time. The reason why this property is required is that the injection of electric charges into the toner T and the transfer of the toner are not performed at the same time, but there is some interval between them. Therefore, if the toner does not have a suitable charge retention property, the toner cannot be satisfactorily transferred even if electric charges are injected into the toner.

The high electric resistivity is required for the toner since this is a factor which determines the decay of electric charges held by the toner. More specifically, when the electric resistivity (as a matter of course, the volume resistivity) of the toner T is low, charges injected into the toner are readily conducted away into the neighboring toner particles. Therefore, the low resistivity of the toner brings about the lowering of the image density of the recorded image as well as the resolution thereof. This is because if the charges injected into the toner diffuse, the quantity of electric charge per toner particle is reduced and it becomes difficult to transfer the toner and accordingly the image density is lowered. Furthermore, toner which should not be transferred is transferred by the electric charges applied thereto due to the above-mentioned diffusion of charges so that the resolution of the image is reduced.

Therefore, the toner for use in the invention has to have both the charge retention property and the high electric resistivity, depending upon a required image density and resolution. However, this does not necessarily mean that the higher the electric resistivity, the better, since suppose that the resistivity of the toner is set constant and the relative speed of the multi-stylus electrode 2 with respect to the donor 1 is also set constant, a voltage to be applied to the stylus electrodes for the injection of charges into the toner has to be increased as the thickness of the toner layer on the donor 1 is increased. When designing a recording apparatus in practice, there is an optimum level for the voltage to be applied to the stylus electrodes.

In the meantime, the relative speed of the donor 1 to the multi-stylus electrode 2 has to be greater than a certain value in order to maintain a certain recording speed. When the voltage to be applied to the multi-stylus electrode 2 and the recording speed are set at certain values, respectively, and the electric resistivity of the toner is high, the thickness of the toner layer on the donor 1 has to be reduced. However, if the toner layer on the donor 1 is too thin, the image density of the obtained visible pattern image becomes low. Therefore, the property of the high resistivity of the toner is not a concept to be discussed using an absolute scale, but it is flexible concept that is effected by a balance between the recording speed and the image density. Thus, the terminology of the high resistivity used in this application has a broad range. In one case, it may signify a comparatively low resistivity and in another case, it may signify a comparatively high resistivity.

In the process as shown in FIG. 1, a toner having a comparatively high resistivity is effective. The comparatively high resistivity here means a relatively high resistivity in the range of the condition which satisfies a requirement of a high resistivity in the toner in general use.

When the process as shown in FIG. 1 is carried out using a comparatively low resistivity toner, toner deposition in the background of copy slightly occurs. Probably this is because some electric charges are injected from the donor 1 into the toner that should not be transferred, by the effect of the electric field formed by the charges applied to the recording sheet S at the time of image transfer and the toner thus charge is also transferred.

Figure 2:
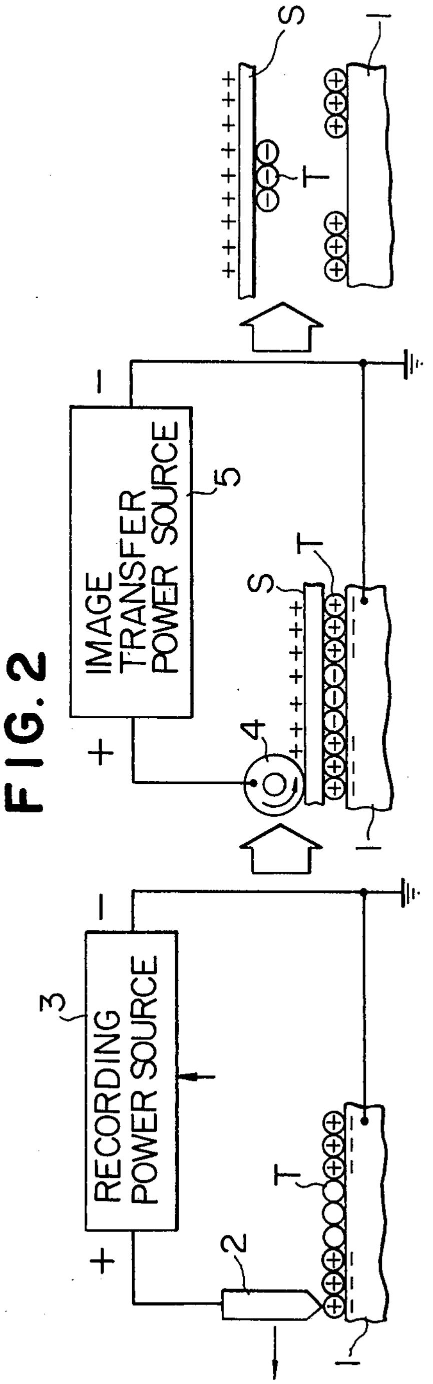
FIG. 2 shows diagrammatically another embodiment of a LIST recording process of the invention.

In the case of a comparatively low resistivity toner, a process as shown in FIG. 2 is suitable. In this process, the toner, except the toner by which a visible pattern is to be recorded, is selectively charged by the multi-stylus electrode 2. In this process, the toner by which a visible pattern is to be recorded is left uncharged and the other toner is selectively charged by the multi-stylus electrode 2 and the recording sheet S is superimposed on the toner layer having a charge distribution corresponding to the pattern signal and the recording sheet S is charged to the same polarity as that of the toner, that is, a positive polarity in this case, by the image transfer roller 4. The positively charged toner is repelled by the positive charges applied to the recording sheet S and therefore the toner is not transferred to the recording sheet S. Therefore, the toner is not deposited on the background of the recording sheet S.

In the meantime, the uncharged toner is polarized or some negative charges are induced into the toner from the donor 1 by the action of the positive charges applied to the recording sheet S, so that the toner which is not charged to the positive polarity is transferred to the recording sheet S by a mutual action with the positive charges.

However, in the process as shown in FIG. 2, the transfer force at the time of the transfer of the toner is not so great and the process has a shortcoming in that the image density of the obtain visible pattern is lowered, depending upon the employed recording conditions.

Figure 3:
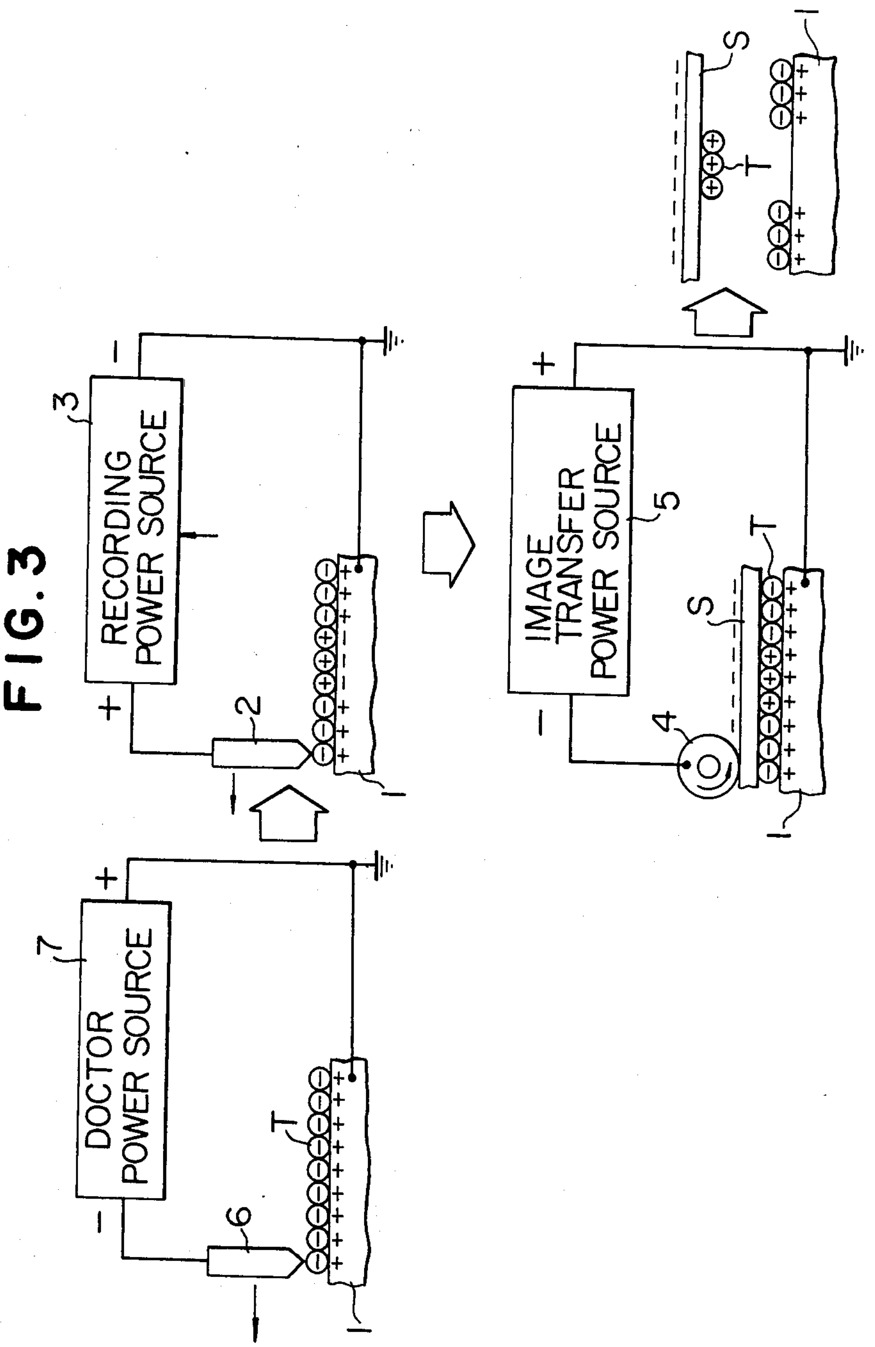
FIG. 3 shows diagrammatically a further embodiment of a LIST recording process of the invention.

In contrast with this, when the invention is carried out using the process as shown in FIG. 3, a visible pattern having a high image density without toner deposition on the background can be obtained.

In the processes in FIGS. 1 and 2, the multi-stylus electrode 2 can be used as a doctor to form the layer of toner on the donor 1, utilizing the relative movement of the multi-stylus electrode 2 to the donor 1. However, in order to carry out the process in FIG. 3, an exclusive doctor 6 for forming the layer of toner is employed. The doctor 6 has to be electrically conductive at least on its surface and as the electrically conductive material for the doctor 6, a material having a higher charge injection effect on the toner than on the donor 1 is selected. To the doctor 6 is applied, for example, a negative potential from a doctor power source 7, and the doctor 6 forms a uniform and thin layer of the toner T on the donor 1 utilizing its relative movement to the donor 1 and at the same time, the doctor 6 injects negative charges uniformly into the toner which forms the toner layer so that the toner layer is uniformly charged to a negative polarity. The multi-stylus electrode 2 then makes a relative movement to the donor 1, while in contact with the thus uniformly charged toner layer, and when a pattern signal is applied to the multi-stylus electrode 2, the electrode 2 selectively injects positive charges into the toner to be transferred so that the toner is charged to a positive polarity. Thus, by the positive and negative charge distribution of the toner T, the toner layer having a charge distribution corresponding to the pattern signal is obtained on the donor 1. When the recording sheet S is then superimposed on the thus charged toner layer and an electrostatic image transfer with a negative polarity is performed by the image transfer roller 4, only the positively charged toner is transferred to the recording sheet S and the negatively charged toner is repelled from the recording sheet S by the negative charges applied to the recording sheet S and the negatively charged toner is not transferred, so that no toner is deposited on the background of the recording sheet S and a visible pattern with a high image density can be obtained.

The recording method of this type is named LIST (Latent Image Injecting to Surface of Toner) Method by the inventor of the present invention, since a pattern to be recorded is formed on the donor 1 in accordance with the charge distribution of the toner layer on the donor 1.

In the above-mentioned embodiment, the image transfer roller 4 is employed in the image transfer process. However, the image transfer can be performed by a known electrostatic image transfer device utilizing corona discharge instead of the image transfer roller 4.

Furthermore, in the process as shown in FIG. 3, the toner is charged to a negative polarity using the doctor 6. However, the negative charging of the toner layer can be performed by disposing a corona charger between the doctor 6 and the multi-stylus electrode 2 and using the doctor 6 only for the purpose of forming the toner layer. In the other methods, the toner layer may be uniformly charged by triboelectric charging from the doctor 6, or the toner or the toner layer may be charged positively and negatively at the same time by the multi-stylus electrode 2.

Figure 4:
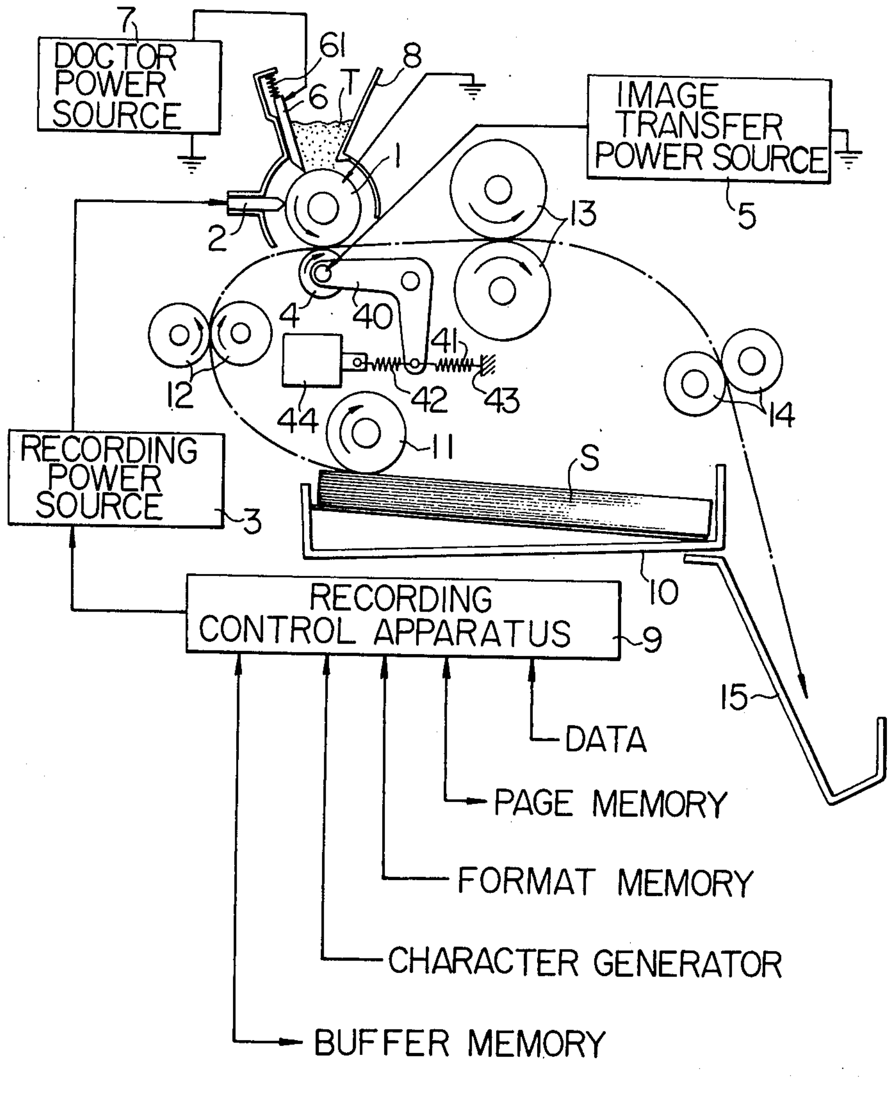
FIG. 4 shows diagrammatically a main portion of an apparatus for carrying out the LIST recording method.

Referring to FIG. 4, there is shown diagrammatically a main portion of an apparatus for performing the process of FIG. 3. For simplification, the same reference numerals as those in FIG. 3 are used in FIG. 4 with respect to those portions which may not bring about any confusion.

The donor 1 is formed in the shape of a roller and is rotatable in the direction of the arrow. The donor 1 can be formed belt-like as well. However, from the practical point of view, it is prefereable that the donor 1 be roller-like. When the donor 1 is roller-like, roughly there are two methods of making the donor 1. In a first method, the donor 1 is made of an electrically conductive rubber roller, and in a second method, the donor 1 is made of a magnetic roller. In the apparatus as shown in FIG. 4, the donor 1 is made of an electrically conductive roller and the surface layer of the donor 1 is made of an electrically conductive silicone rubber, chloroprene rubber, polyurethane rubber or other materials. As the rubber for use in the material of the donor 1, it is preferable to use a rubber whose volume resistivity is $10^{18}$ Ωcm or less.

The toner T is held in a hopper 8. The hopper 8 has an opening portion for supplying the toner therethrough and the opening portion is disposed in an upper portion of the donor 1 in such a manner that the opening portion can be closed by the peripheral surface of the donor 1. In an inner side wall of the hopper 8 on the side of a toner outlet, the doctor 6 is disposed. When the donor 1 is rotated in the direction of the arrow, part of the toner T in the hopper 8 is deposited on the peripheral surface of the donor 1 so that the deposited toner is moved together with the donor 1. The quantity of the thus moved toner is regulated by the doctor 6 and a uniform and thin layer of the toner T is formed on the donor 1 by the doctor 6. The doctor 6 is made of a material which is excellent in wear and good in electric conductivity, such as hard aluminium alloy, phosphor bronze or beryllium copper.

The doctor 6 is in pressure contact with the peripheral surface of the donor 1 by a spring 61 and the thickness of the toner layer on the donor 1 can be adjusted appropriately by the force applied by the spring to the doctor 6.

To the doctor 6 is applied a voltage from the doctor power source 7, and the toner T in the toner layer formed on the donor 1 by the doctor 6 is uniformly charged to a predetermined polarity by charge injection from the doctor 6.

The toner T is non-magnetic and when charges are injected into the toner T by the doctor 6, charges with opposite polarity to that of the charges injected into the toner T are induced in the donor 1 and an imaging force is generated by the charges having the opposite polarity, so that the toner T is attracted to the peripheral surface of the donor 1 by the imaging force.

A lower portion of the hopper 8 is formed so as to cover the donor 1, and the multi-stylus electrode 2 is held in the lower portion in such a manner that its end portion with the multi-stylus electrodes embedded therein is in contact with the toner layer on the donor 1.

A pattern signal is generated in a recording control apparatus 9 by the input of data, exchange of page memory, and reading from a character generator and a format memory, and after the pattern signal is stored in a buffer memory, it is applied to the recording power source 3. The recording power source 3 converts the input pattern signal into a voltage signal and applies the same to the multi-stylus electrode 2, so that part of the toner on the donor 1 is selectively charged to a polarity opposite to the initial polarity by the charge injection from the doctor 6. As a result, a charge distribution of the toner corresponding to the pattern signal is obtained.

The recording sheets S are stocked in a conventional cassette 10 and are individually transported therefrom by a sheet feed roller 11 and are then guided by a guide member (not shown) to reach register rollers 12. When the recording sheet S reaches the register rollers 12, the register rollers 12 set the leading edge of the sheet S in a right position and let it stand by. To the register rollers 12 is applied a drive signal from a control apparatus (not shown), whereby the recording sheet S is transported into an image transfer section with a certain timing by a guide means (not shown). The image transfer roller 4 is pivotally mounted on one end of a lever 40. The other end of the lever 40 is connected to a stationary member 43 through a spring 41 and also connected to a solenoid 44 through a spring 42. When image transfer is made, the solenoid 44 is energized and the lever 40 is turned clockwise and the sheet S coming into the image transfer section is held between the image transfer roller 4 and the donor 1 and a toner image, that is, a visible pattern, is transferred to the sheet S by the voltage applied from the image transfer power source 5. Upon termination of the image transfer, the solenoid 44 is deenergized and the lever 40 is turned counterclockwise so that the image transfer roller 4 is moved away from the donor 1.

When the transfer of the toner image has been completed, the recording sheet S is held between a pair of image fixing rollers 13 and carried therethrough and while the recording sheet S passes through the image fixing rollers, the toner image is fixed to the recording sheet S and thereafter the sheet S is discharged onto a tray 15 by sheet discharge rollers 14.

The process as shown in FIG. 3 was carried out using the above-mentioned apparatus under the following condition: As the toner T, a toner having a volume resistivity of $10^{14}$ Ωcm or more was employed. To the doctor 6 was applied −150 V of potential by the doctor power source 7, and to selected stylus electrodes of the multi-stylus electrode 2 was applied +250 V of potential, so that a charge distribution of toner corresponding to a pattern signal is formed on the donor 1, and −1000 V of image transfer potential was applied to the image transfer roller 4. As a result, a good recording image was obtained. In this experiment, the toner layer formed on the donor 1 was about 30 μm thick. This thickness corresponds to three times the average particle size of the toner T.

Figure 5:
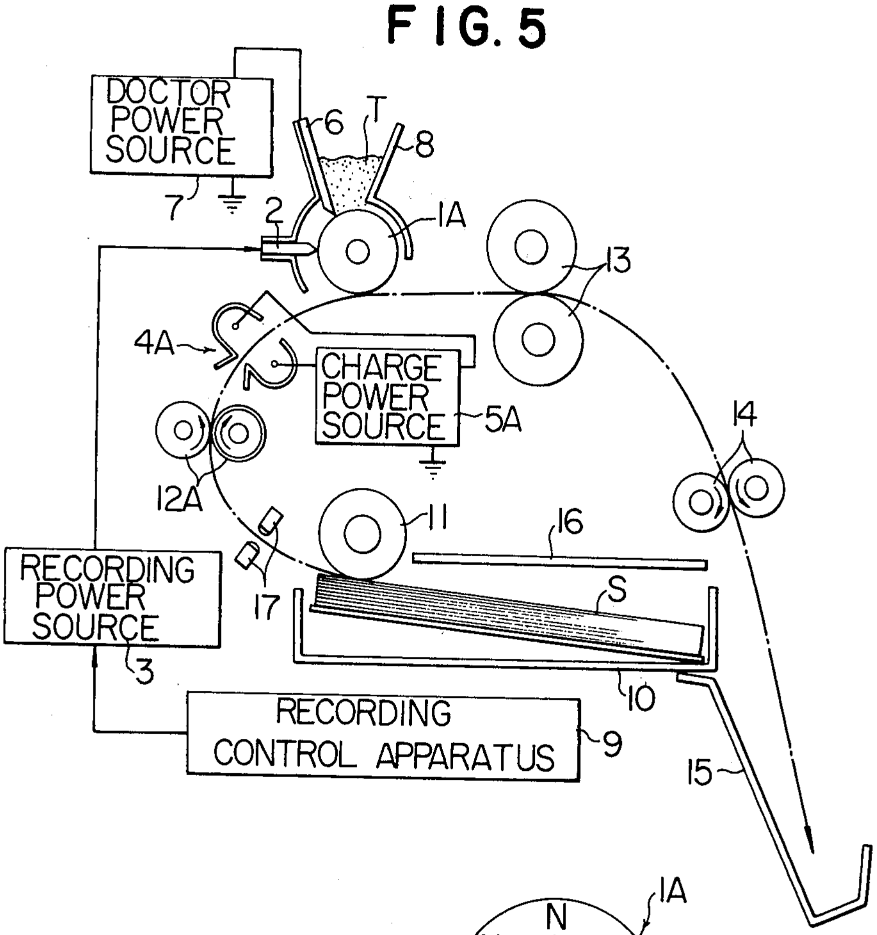
FIG. 5 shows diagrammatically a main portion of another apparatus for carrying out the LIST recording method.

Referring to FIG. 5, there is shown diagrammatically another apparatus for conducting the process as shown in FIG. 3. In FIG. 5, the same reference numerals are given to the same members as those in FIG. 4.

The essential differences between the apparatus of FIG. 5 and that of FIG. 4 are that in the apparatus of FIG. 5, a donor 1A is made of a magnetic roller and as the toner T, magnetic toner TM is employed and that toner image is transferred by corona charging.

Other differences between the two apparatuses are that in the apparatus of FIG. 5, a heater 16 is disposed above the cassette 10 and that a photo-interrupter (an optical detector) 17 is disposed between the cassette 10 and register rollers 12A and that the register rollers 12A contain a heat roller. The other modifications which do not bring about any essential differences can be adopted in FIG. 4.

In the apparatus of FIG. 5, the heater 16 is provided and the heat roller is contained in the register rollers 12A, taking into consideration a case where plain paper is used as the recording sheet S. More specifically, the content of water in the plain paper varies depending upon the humidity in the air and at a high humidity, its electric resistivity is lowered and accordingly the image transfer of the visible pattern may not be performed as well. Therefore, at a high humidity, the heater 16 and the heat roller are energized to dry the recording sheet S sufficiently, so that the adverse effect of the high humidity is eliminated.

Figure 6:
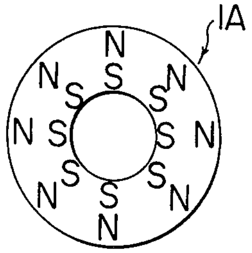
FIG. 6 is a diagrammatical cross section of a magnetic roller which is employed as a doner.

As mentioned previously, the donor 1A is constructed of a magnetic roller. The magnetic roller is magnetized uniformly in its radial directions as shown in FIG. 6 so that the surface of the magnetic roller is uniformly magnetized to one polarity. The toner TM is held on the donor 1A by magnetic attraction and a charge distribution of the toner corresponding to the pattern signal is formed by the doctor 6 and the multi-stylus electrode 2.

Prior to image transfer, the recording sheet S is caused to pass through a pair of charges 4A to which a corona charge voltage is applied by a charge power source 5A so that the two sides of the recording sheet S are charged to opposite polarities by the charger 4A. The recording sheet S is then brought into contact with the donor 1A, whereby a visible pattern is transferred to the sheet S.

The photo-interrupter 17 detects the passage of the transported sheet S and a detection signal generated by the detection of the sheet is utilized to time the transfer of the visible patter to the sheet S.

The magnetic roller, that is, the donor 1, employed in this apparatus is magnetized in the above-mentioned manner and this type of the magnetic roller is called a radial flux type magnetic roller.

The reason for using the radial flux type magnetic roller in this apparatus is that the head of the toner formed on the donor 1A stands upright on the peripheral surface of the donor 1A and the toner density on the peripheral surface of the donor 1A becomes constant.

As the donor 1A, a radial flux type magnetic roller whose peripheral surface is coated with an electrically conductive rubber, and a radial flux type magnetic roller provided with an electrically conductive and non-magnetic sleeve coaxially over the peripheral surface of the roller can be employed as well. An ordinary magnetic roller can be employed as the donor 1 in some cases. When the sleeve is employed, the magnetic roller is set stationarily, while the sleeve is rotatable. This is because the arrangement of the toner on the sleeve is not disturbed.

In the recording methods so far explained, it is supposed that the visible pattern corresponding to the pattern signal is positive with respect to the pattern signal. However, a visible pattern which is negative with respect to the pattern signal can be obtained without any difficulty. For example, in the process as shown in FIG. 1, the distributions of the toner charged by the charge injection and the uncharged toner are reversed. Furthermore, in the process as shown in FIG. 2, the distributions of the quenched toner and unquenched toner are reversed. In the process as shown in FIG. 3, a visible pattern which is positive with respect to the pattern signal and a visible pattern which is negative with respect to the pattern signal can be obtained as desired by changing the polarity of the electrostatic image transfer.

In the processes explained by referring to FIG. 1 to FIG. 6, when the toner having the charge distribution on the donor 1 or 1A is transferred to the recording sheet S, a bias voltage is applied to utilize an electrostatic force which acts on the toner. Therefore, in the system of this type, it is difficult to form a visible pattern on an electrically conductive recording material or a recording material whose surface is uneven.

Generally, toner is deposited on the donor and therefore when the recording material is at a high temperature, the recording material has an adverse effect on the charge distribution of the toner and it becomes difficult to transfer only the toner whose electric charges are distributed in accordance with the pattern signal and if there are some lumps of toner projecting from the surface of the donor 1, such lumps of toner are fused and smear the image surface of the recording member and the image transfer to the recording member at a high temperature becomes more difficult.

Now therefore, a LIST recording method for forming a visible pattern and recording the same on a particular recording member of the above-mentioned type and an apparatus suitable for the method will be explained.

In this method, a toner whose charge distribution corresponds to a pattern signal is formed on the donor and the thus charged toner with a visible pattern is transferred to an image transfer medium and then the visible pattern is transferred to a desired recording material which is in contact with the image transfer medium, utilizing the adhesiveness of the toner.

In other words, the toner having the above-mentioned charge distribution on the donor is first transferred to the image transfer medium and then transferred indirectly to the recording member, using the adhesiveness of the toner. Therefore, when the image transfer medium is made of some appropriate material, the visible pattern can be transferred easily and securely to a variety of recording members to which the visible pattern cannot be transferred directly, such as a recording material at a high temperature and a recording material whose surface is uneven.

Referring to a specific apparatus for use in this method in FIG. 7, this method will now be explained more specifically.

Figure 8A:
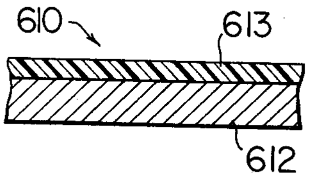
FIGS. 8(*a*) and 8(*b*) show schematically the constructions of image transfer mediums, respectively.
Figure 8B:
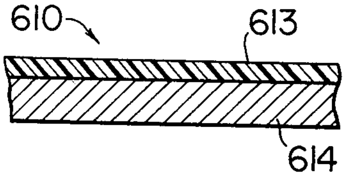
Figure 7:
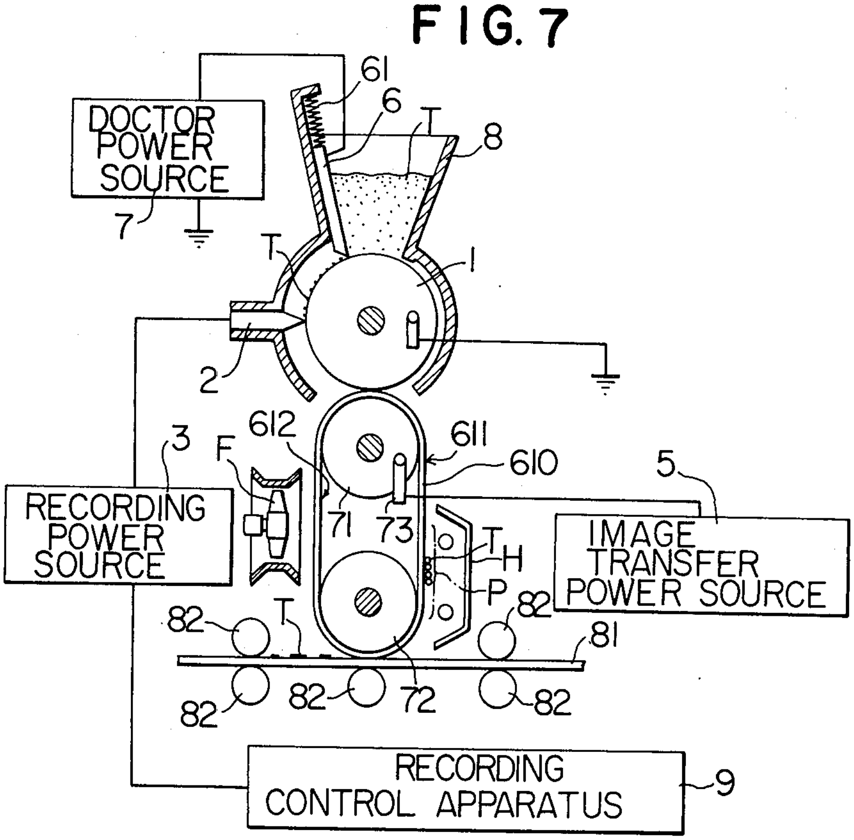
FIG. 7 shows diagrammatically a main portion of a still further apparatus for carrying out the LIST recording method.

In the apparatus of FIG. 7, as the image transfer medium, on image transfer belt 610 having an endless image transfer surface is in contact with a lower portion of the donor 1. The image transfer belt 610 is driven by a pair of guide rollers 71, 72 in a manner such that the peripheral surface 611 of the image transfer belt 610 moves at the same speed and direction as the peripheral surface of the donor 1. Furthermore, the guide roller 71 is used as an image transfer roller and by the guide roller 71, the image transfer belt 610 is brought into contact with the outer peripheral surface of the donor 1 and by the other guide roller 72, the image transfer belt 610 is brought into contact with an iron plate 81 which serves as the recording member. The iron plate 81 is guided at the same speed as that of the image transfer belt 610. The belt 610 consists of a stainless belt 612 on which a layer of silicone rubber 613 is coated as shown in FIG. 8(*a*) or of a polyester belt 614 on which the silicone rubber 613 is coated as shown in FIG. 8(*b*). The silicone rubber 613 constitutes a dielectric layer. On the back side of the dielectric layer, that is, on the inner peripheral surface of the image transfer belt 610, it is required to dispose a conductor to which a bias voltage for image transfer (in this apparatus, a bias voltage of negative polarity) is applied by the image transfer power source 5 at least when the donor 1 and the image transfer belt 610 are in contact with each other, that is, at least when the dielectric layer of the image transfer belt 610 is in contact with the donor 1. In order to satisfy this requirement, in the case of the image transfer belt 610 as shown in FIG. 8(*a*), a brush 73 for applying the bias voltage for image transfer is in direct contact with the stainless belt 612 or as shown in FIG. 7, an image transfer roller 71 is made of an electrically conductive material and the bias voltage for image transfer is applied to the stainless belt 612 through the image transfer roller 71. In the case of the image transfer belt 610 as shown in FIG. 8(*b*), the image transfer roller 71 has to be made of electrically conductive material since the image transfer belt 610 has only dielectric layers. Therefore, to the toner T having a positive charge distribution in accordance with the pattern signal I on the donor 1, there is applied a negative bias voltage, so that a visible pattern P is transferred to the outer peripheral surface 611 of the image transfer belt 610. It is preferable to use an electrically insulating silicone rubber 613 in the material for forming the dielectric layer of the image transfer belt 610. However, the use of an electrically insulating material is not an indispensable condition, and any material, except a good conductor, can be employed in the dielectric layer. Experimentally, it has been confirmed that as the material for forming the dielectric layer, aluminium alloy without its oxide film thereon can be employed although the image density of the visible pattern was too low for practical use.

The image transfer belt 610 to which the visible pattern P has been transferred is moved towards the iron plate 81 by the guide roller 72. The iron plate 81 is a recording section which is disposed on the opposite side of the donor 1. During the movement of the image transfer belt 610, the toner T which forms the visible pattern P on the image transfer belt 610 is heated by a heating means, for example, by an electric heater H, so that the toner T is fused on the image transfer belt 610. The fused toner is brought into pressure contact with the iron plate 81, that is, the recording member, which is moved at the same speed as that of the image transfer belt 610. Since the toner T contains some resin components, when it is fused, it becomes adhesive and accordingly the toner is securely transferred to the iron plate 81 when it is brought into pressure contact with the iron plate 81. Since the iron plate 81 cools the fused toner, the transferred toner image is not peeled off from the iron plate 81 any longer. Normally, the silicone rubber 613 of the image transfer belt 610 has a thermal resistance to temperature as high as about 200° C. and the fused toner is peeled off from the silicone rubber 613 more easily at a high temperature than at a low temperature. Therefore, the toner is securely transferred from the silicone rubber 613 to the iron plate 81. After the completion of the image transfer, the silicone rubber 613 still remains at a high temperature and if the high temperature is maintained when the silicone rubber 613 again comes to the donor 1, the charge distribution of the toner on the donor 1 is weakened by the high temperature and the transfer of the visible pattern is not performed normally. Therefore, a cooling fan F for cooling the image transfer belt 610 which moves in the direction of the donor 1 is disposed so as to face the image transfer belt 610. In the meantime, the iron plate 81 is guided so as to be in contact with the image transfer belt 610 by a guide roller train 82. If the recording material is not belt-like but in the shape of a block (not shown), it is preferable to dispose a known timing adjustment device (not shown) so that the recording material is supplied to its guide means in time to the movement of the visible pattern of the image transfer belt 610. Image transfer can be performed even if the surface of the iron plate 81 or the recording member is slightly uneven. In other words, unlike the case in which a visible image pattern is directly transferred from the donor 1 to the recording member, since the image transfer belt 610 made of a silicone rubber that can be easily formed into various shapes is employed, the peripheral surface 611 of the image transfer belt 610 can be formed into a shape corresponding to some undulation of the recording member, so that the adhesive toner T can be transferred to the image transfer surface of the recording member. Since the toner is transferred by its adhesiveness, the visible pattern can be transferred to a thick recording material or porous recording material, such as cloth and wood.

Furthermore, according to the invention, when a conventional recording paper is employed as the recording member, since the donor 1 is not in direct contact with the recording paper, such an inconvenience as that paper dust, which is frequently attracted to the recording sheet and has an adverse effect on the toner T on the donor 1, can be prevented.

According to this recording method, unlike the method of directly transferring the toner image having a charge distribution corresponding to a pattern signal to various types of recording members from the donor 1, the toner image formed on the donor 1 is in a reverse relationship with the toner image obtained by the apparatuses of FIGS. 4 and 5. In other words, since a normal image, that is, an original image, is transferred to the recording member, a reverse or mirror image has to be transferred to the image transfer belt 610 and therefore the charge distribution of the normal image has to be formed on the donor 1. This is in a reverse image relationship with the image formed by the previously mentioned direct image transfer method. Therefore, it is required to apply a pattern signal, which is obtained by reversing the pattern signal in the case of the direct image transfer method, to the multi-stylus electrode 2. Thus, the recording control apparatus 9 of FIG. 7 processes the received data input signal in the form suitable for the formation of a normal image. In accordance with a normal image formation signal, a pattern signal is applied to the multi-stylus electrode 2 from the recording power source 3, so that electric charges are selectively injected into the toner on the donor 1.

The recording method of the invention was carried out using the apparatus as shown in FIG. 7 under the following condition: An image transfer belt comprising 100 $\mu m$ thick polyester film coated with silicone rubber in the thickness of 20 $\mu m$ was used and the doctor voltage was set at $-200$ V, and the recording voltage at $+200$ V, and the bias voltage of the image transfer roller 71 at $-400$ V, respectively. As a result, a good image was obtained on the iron plate 81.

This system is constructed in a manner such that the toner having a charge distribution corresponding to a pattern signal is transferred from the donor 1 to an image transfer medium and then the visible pattern is transferred from the image transfer medium to the recording member. Therefore, the construction of this system can be modified within the above-mentioned principle.

Figure 9:
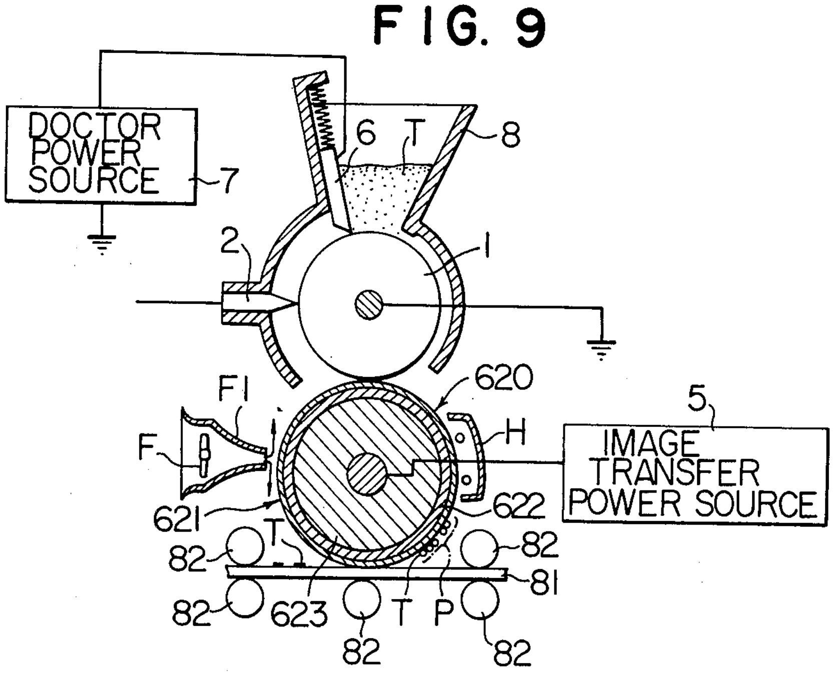
FIG. 9 shows diagrammatically a main portion of a further apparatus for carrying out the LIST recording method.

As in an apparatus illustrated in FIG. 9, the image transfer medium can be made in the form of an image transfer drum 620 having a peripheral surface 621, which is rotated by a drive means (not shown) in a manner such that the peripheral surface of the image transfer drum 620 moves at the same speed and direction as the peripheral surface of the donor 1. An outer peripheral portion 621 of the image transfer drum 620 is made of a dielectric layer, such as a silicone rubber layer, and an inner peripheral portion is made of an electrically conductive metallic cylinder 622 and these outer end inner peripheral portions are fitted on a drum body 623 so that the image transfer drum 620 is constructed. On one side of the drum 620, there is disposed an electric heater H for fusing toner and on the opposite side of the drum 620, there is disposed a nozzle F1 having a fan F for blowing cooled air against the dielectric layer of the image transfer drum 620. Under the image transfer drum 620, a recording medium, for example, the iron plate 81 is moved under the guidance of the guide roller train 82 at the same speed as that of the outer peripheral surface 621 of the drum 620, so that a visible patern P of the toner is successively transferred from the image transfer drum 620 to the iron plate 81 at their contact position. This apparatus is made more compact in size than the apparatus as shown in FIG. 7.

Figure 10:
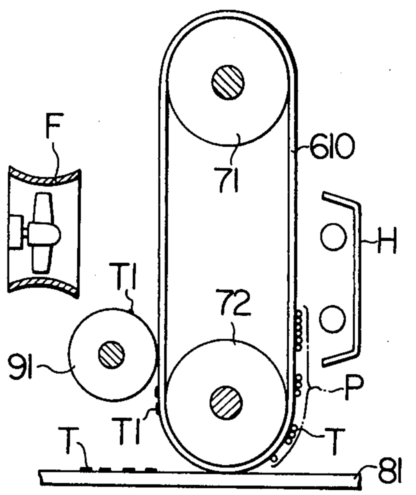
FIG. 10 shows schematically a cleaning system for an image transfer medium for use in the invention.

In each apparatus of FIG. 7 to FIG. 9, the image transfer medium is made of silicone rubber from which fused toner is easily exfoliated so that the fused toner scarcely remains on the image transfer medium when the fused toner is transferred from the image transfer medium to the recording member. However, when it is required that the dielectric layer be made of other materials, its exfoliating property with respect to the toner may become a problem in some case. If the exfoliating property becomes a problem, it is preferable to attach a cleaning member as shown in FIG. 10 to the image transfer belt 610. The cleaning member can be disposed in front of the cooling fan F or behind the cooling fan as the case may be. The cleaning member is constructed of a rotatable metallic roller 91 which is in pressure contact with an image transfer belt 610 so as to exfoliate residual fused toner T1 from the image transfer medium or the image transfer belt 610. Utilizing the property of the residual toner T1 that it adheres to the metallic surface of the metallic roller 91 more tightly than to the surface of a rubber belt, the residual toner T1 reaching the metallic roller 91 is removed from the image transfer belt 610 by rotating the metallic roller 91 continuously in pressure contact with the image transfer belt 610. The toner T1 deposited on the metallic roller 91 can be scraped off periodically or removed by attaching a scraper blade (not shown) to the metallic roller 91.

Figure 11:
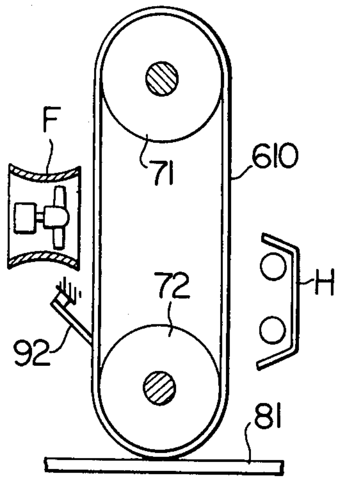
FIG. 11 shows schematically another cleaning system for an image transfer medium for use in the invention.

As shown in FIG. 11, a scraper blade 92 can be used as the cleaning member by directing the scraper blade 92 towards the image transfer belt 610.

Figure 12:
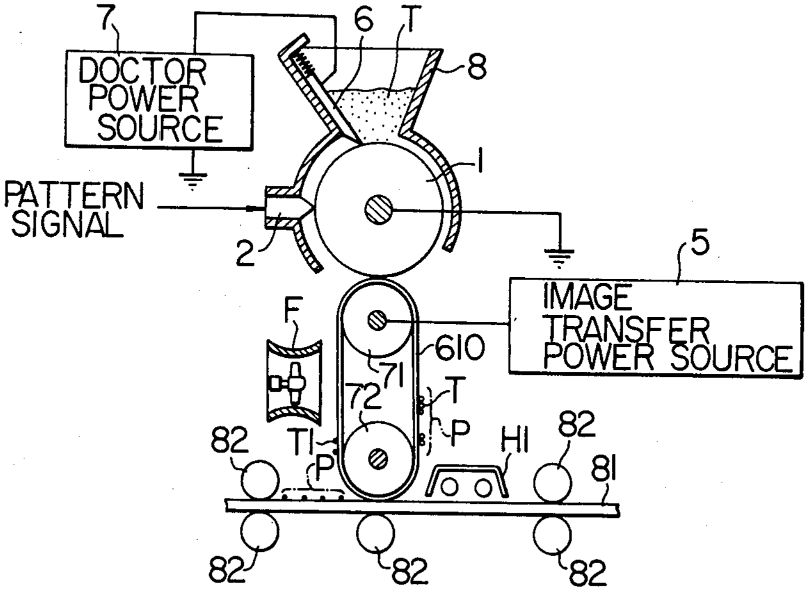
FIG. 12 shows diagrammatically a main portion of a further apparatus for carrying out the LIST recording method.

In a marking apparatus for marking on an iron plate as shown in FIG. 12, unlike the apparatus as shown in FIG. 7, the heater H directed to the image transfer belt 610 is not provided. In this apparatus, the visible pattern P consisting of the toner T on the image transfer belt 610 is directly brought into contact with the recording member or the iron plate 81. Prior to this, by a heater H1, the iron plate 81 is preheated to a temperature capable of fusing the toner T when the iron plate 81 is brought into contact with the toner T on the image transfer belt 610. In other words, in this apparatus, in order to transfer the toner T on the image transfer belt 610 to the iron plate 81, the toner T is not preheated, but the iron plate 81 or the recording member is preheated and then brought into contact with the toner T, so that the visible pattern P is transferred to the recording member by the adhesion of the fused toner T thereto. When utilizing this method, it is preferable to employ a metallic plate as the recording member. In this case, since the residual toner T on the image transfer belt 610 is not fused, the cooling fan F can be used as the cleaning member by blowing the residual toner T off from the image transfer belt 610. Furthermore, the cleaning can be performed by a rotary brush (not shown).

Figure 13:
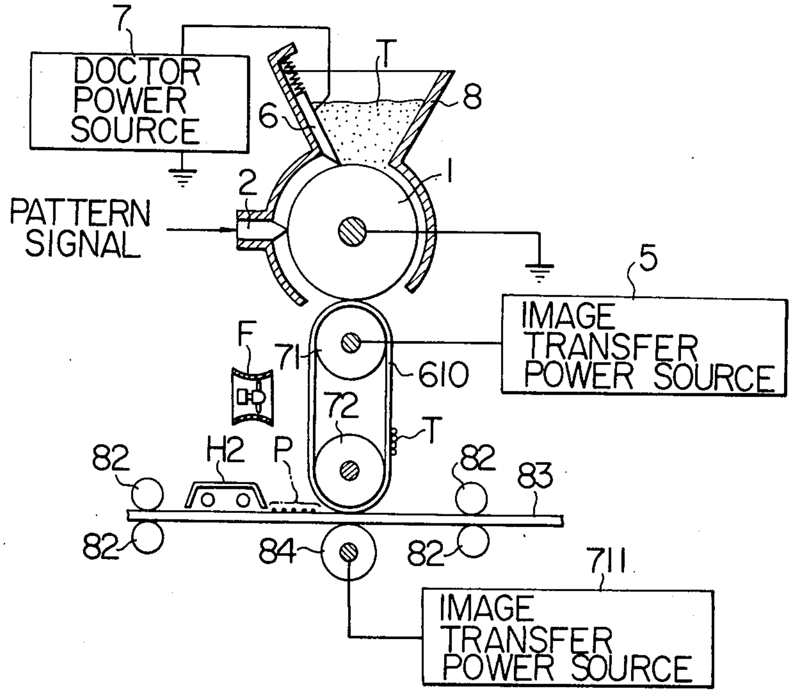
FIG. 13 shows diagrammatically a main portion of a further apparatus for carrying out the LIST recording method.

In an apparatus as shown in FIG. 13, the heater H is not provided near either the image transfer belt 610 or a transfer sheet 83 which serves as the recording member, and a second image transfer roller 84 is provided so as to be directed towards the guide roller 72. To the second image transfer roller 84 is applied a bias voltage from image transfer power source 711, so that the toner T on the image transfer belt 610 is electrostatically transferred to the transfer sheet 83 which comes successively between the second image transfer roller 84 and the guide roller 72. The thus transferred visible pattern P is then fixed to the transfer sheet 83 by a heater H2.

The above-mentioned methods have an advantage that the donor is not smeared by the recording member since the toner having a charge distribution corresponding to a pattern signal on the donor is not directly transferred to the recording member, but is indirectly transferred to the recording member through the image transfer medium.

Next, a LIST recording method and apparatus therefor will now be explained, which is capable of modifying a latent electrostatic image formed on a latent image bearing member by a desired pattern and making the latent image visible and then recording the visible image.

The word "modify" has various meanings, such as to limit or restrict, to make partial changes in, to decorate and to correct. Depending upon the differences of the meanings, the embodiments of the above-mentioned methods vary. The representative embodiments according to this method are as follows: Format synthesis (decorate), superimpose (make partial changes in), masking (limit or restrict or correct) and erase (correct).

Figure 14:
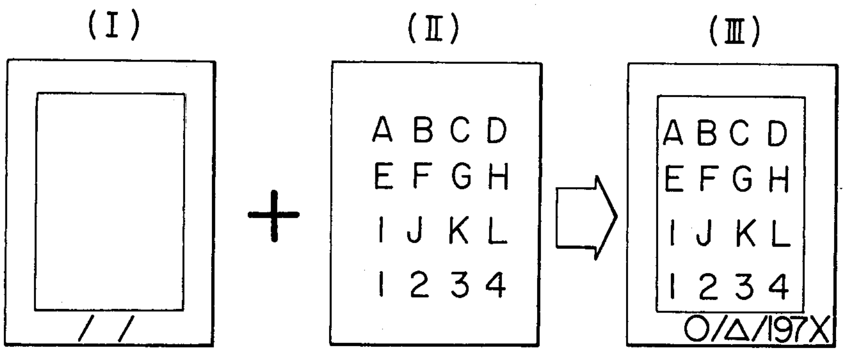
FIGS. 14, 15 and 16 are the drawings for explaining the process of a format synthesis by the LIST recording method.

First of all, the format synthesis will now be explained. The format synthesis signifies an operation of obtaining a synthesized visible pattern, namely a pattern as shown in FIG. 14 (III), from a format information as shown in FIG. 14 (II). The pattern of FIG. 14 (I) and the pattern of FIG. 14 (II) modify or decorate each other in terms of a visible pattern obtained as a recorded image.

Figure 15:
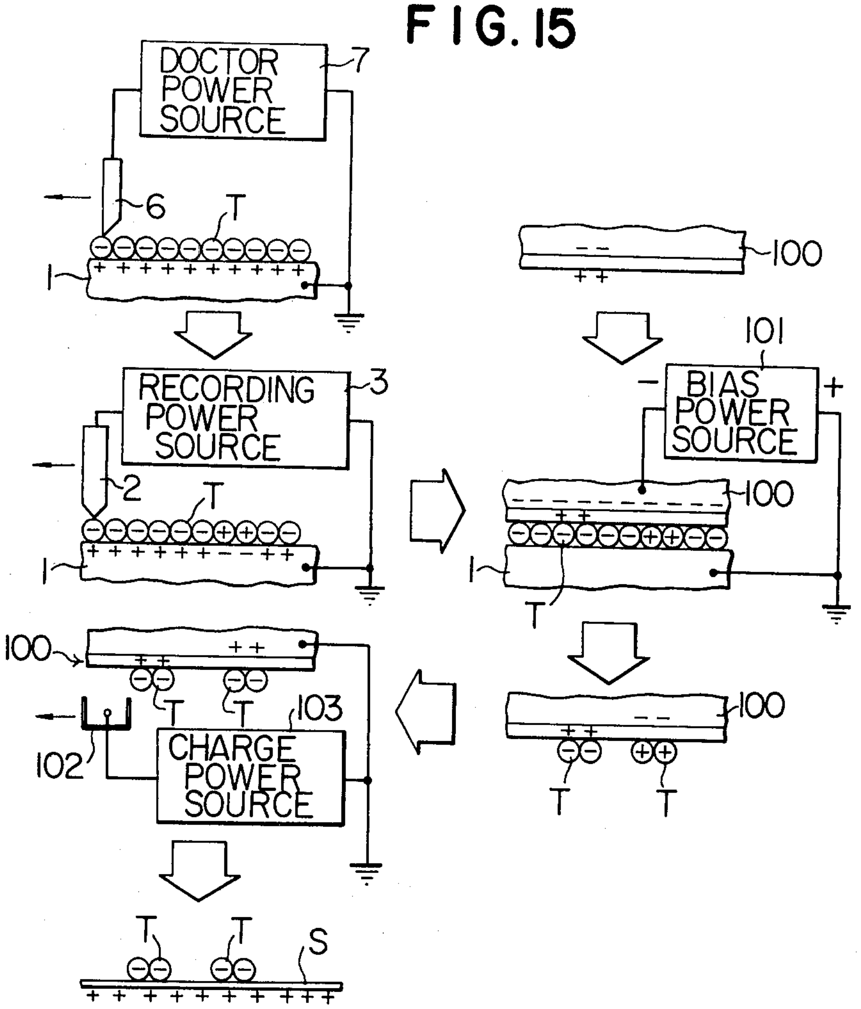

Referring to FIG. 15, there is shown diagrammatically the process of the format synthesis. For the convenience of explanation, in FIG. 15, the same reference numerals are employed as those in FIG. 3 with respect to those members which may not bring about any confusion.

In the toner layer on the donor 1, there is formed a charge pattern corresponding to a pattern signal by the same procedure as that shown in FIG. 3. The pattern signal corresponds to, for example, a pattern as shown in FIG. 14 (II), which is identical to the charge pattern of the positively charged toner on the donor 1.

In the meantime, a latent electrostatic image having such a pattern as shown in FIG. 14 (I) is formed on a latent image bearing member 100. As the latent image bearing member 100, a dielectric type member having a dielectric layer formed on an electrically conductive support member or various types of conventional photoconductors can be employed. If the latent image bearing member 100 is of the dielectric type, a latent electrostatic image is formed on the surface of the latent image bearing member 100 by selective charging, and if the latent image bearing member 100 is of a conventional photoconductor, the latent electrostatic image is formed on the photoconductor by charging the photoconductor and projecting a light image thereto.

Figure 16:
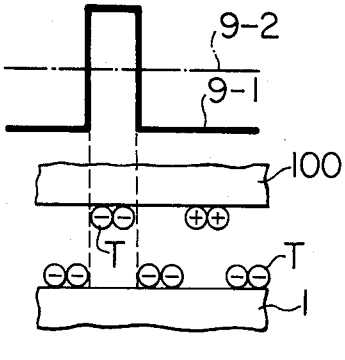

The toner layer on the donor 1 and the latent image bearing member 100 are superimposed one over the other and a bias voltage is applied between the donor 1 and the latent image bearing member 100 by a bias voltage power source 101 so that image transfer is performed. The bias voltage to be applied between the donor 1 and the latent image bearing member 100 has to be as great as the voltage as indicated by reference numeral 9-2 relative to the surface potential of the photoconductor as indicated by reference numeral 9-1 in FIG. 16. In other words, the voltage corresponding to the voltage between the potential of the background and the potential of the latent electrostatic image is applied. Thus, the positively charged toner on the donor 1 is attracted to the latent image bearing member 100 where the latent electrostatic image is developed. Namely, the pattern as shown in FIG. 14 (I) is made visible mirror-image-like by the negatively charged toner. In the meantime, the positively charged toner on the donor 1 is transferred to the latent image bearing member 100 by the bias voltage so that the pattern as shown in FIG. 14 (II) is made visible mirror-image-like. By charging the surface of the latent image bearing member 100 to a negative polarity, for example, using a precharger 102 to which a discharge voltage is applied by a charger power source 103, the toner image on the surface of the latent image bearing member 100 is uniformly charged to one polarity, for example, to a negative polarity. The toner image is then electrostatically transferred to the recording sheet S by an appropriate method, whereby a normal image of a synthesized pattern is obtained on the recording sheet S. The synthesized toner image is then fixed to the sheet S.

Figure 17:
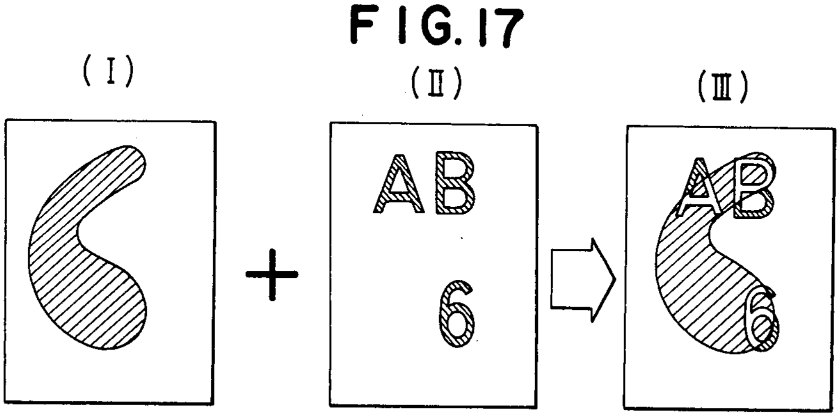
Figure 18:
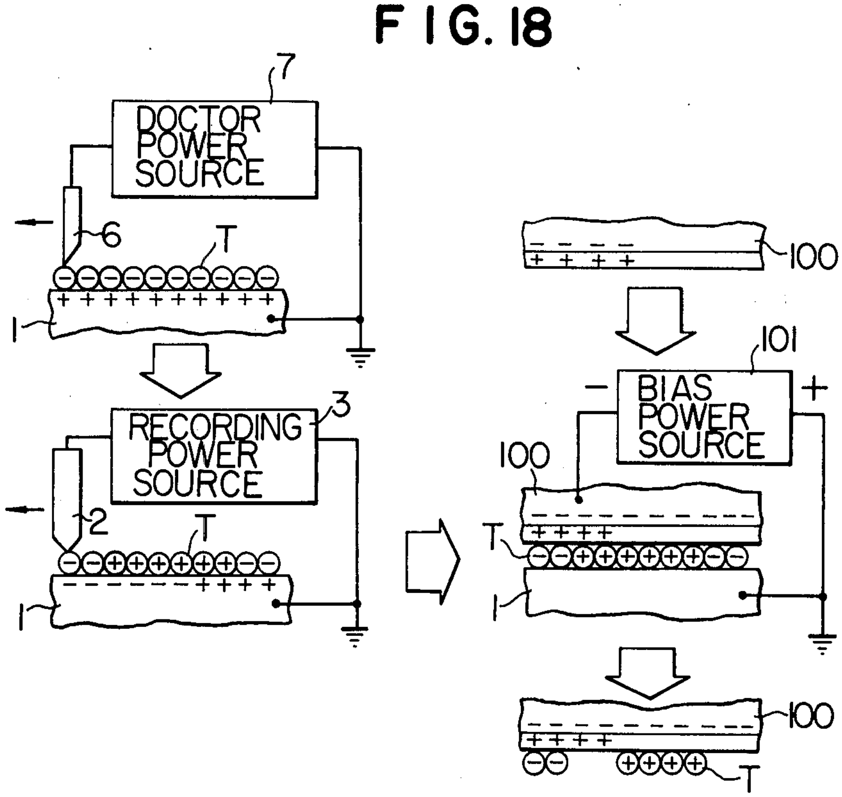

Referring to FIGS. 17 and 18, the superpose method will now be explained.

The superpose method signifies a method of superposing a desired analogue pattern as shown in FIG. 17 (I) on another desired pattern as shown in FIG. 17 (II) in such a state as shown in FIG. 14 (III) and for recording the superposed pattern. In this method, even if the two patterns are overlapped, each of the two patterns can be recognized in their synthesized pattern. In other words, in this recording process, each pattern is modified or changed mutually by the other pattern.

Essentially, the superpose process does not differ from the format synthesis process, provided that there is a slight difference in their synthesized image between the two methods.

For example, the pattern as shown in FIG. 17 (II) is given in the form of a positive charge pattern of the toner on the donor 1 by the process of FIG. 3. In the meantime, the pattern as shown in FIG. 17 (I) is formed as a latent electrostatic image on the latent image bearing member 100 (FIG. 18).

Figure 19:
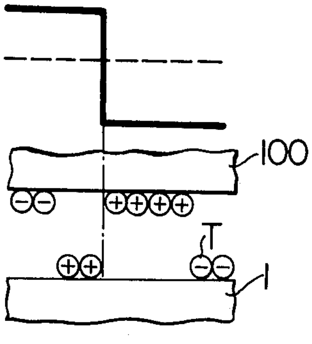
FIGS. 17, 18 and 19 are the drawings for explaining a superpose process by the LIST recording method.

The toner layer having a charge distribution is superposed on the surface of the latent image bearing member 100 on which the latent electrostatic image is formed, and as shown in FIG. 19, an image transfer bias voltage indicated by the dash lines, as compared with the surface potential of the latent image bearing member 100 indicated by the solid line, namely a voltage between the background potential and the latent image potential is applied between the toner layer and the surface of the latent image bearing member 100. Of the positively charged toner distributed in accordance with the pattern as shown in FIG. 14 (II), the toner in a portion which does not overlap the latent electrostatic image is moved onto the latent image bearing member 100. In the meantime, the positively charged toner in a portion which overlaps the latent electrostatic image is repelled by the positive charge of the latent electrostatic image and therefore the toner is not transferred to the surface of the member 100. As a result, the latent electrostatic image is developed only by the negatively charged toner. Therefore, in the image obtained on the recording sheet S by treating the visible image on the member 100 in the same manner as in the case of the previously mentioned format synthesis method, the portions in which the patterns of FIGS. 17 (I) and 17 (II) do not overlap are made visible, while the overlapped portions are not made visible and remain white. Thus, a contrast image as shown in FIG. 17 (III) is obtained.

As can be seen from the above explanation, the format synthesis and the superpose are the same in terms of the process.

The masking method will now be explained. In the masking method, a pattern as shown in FIG. 20 (I) and a pattern consisting of a hatched area as shown in FIG. 20 (II) are matched and, of the pattern of FIG. 20 (I), the portions overlapping the pattern of FIG. 20 (II) are selectively made visible so that a pattern as shown in FIG. 20 (III) is obtained.

Figure 20:
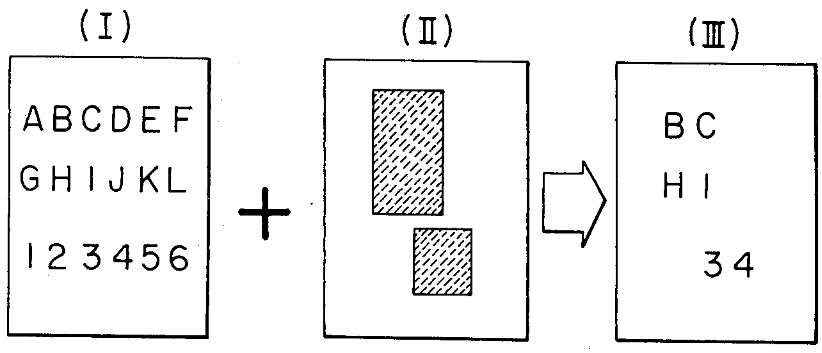
FIGS. 20 and 21 are the drawings for explaining the masking by the LIST recording method.

In other words, in the masking method, the pattern as shown in FIG. 20 (I) is restrictively modified by the pattern as shown by FIG. 20 (II).

Figure 21:
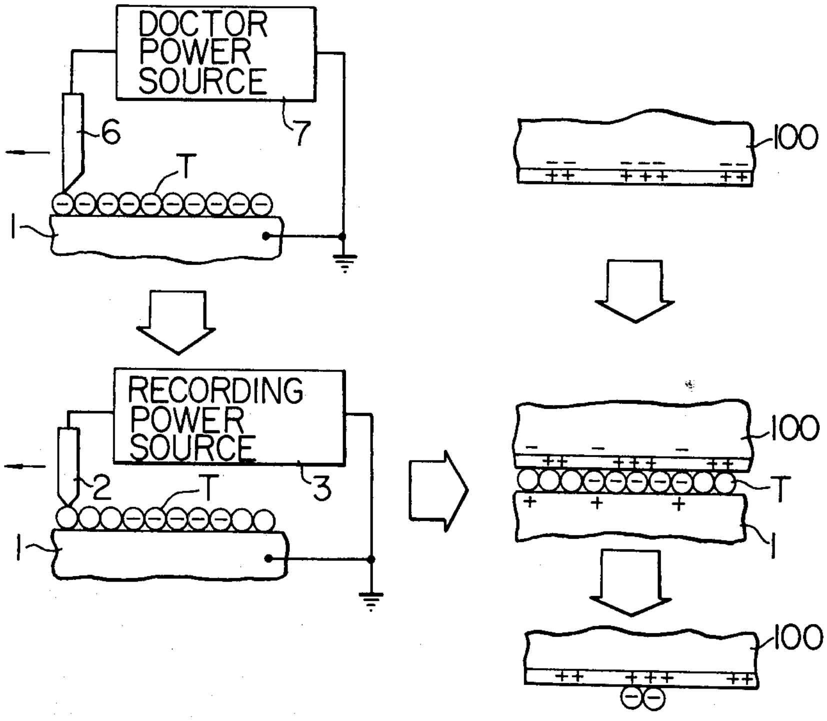

Referring to FIG. 21, the masking process will be explained hereafter. A pattern to be restrictively modified by the masking, for example, the pattern as shown in FIG. 20 (I) is formed in the form of a latent electrostatic image on the latent image bearing member 100. In the meantine, a pattern for masking, for example, the pattern as shown in FIG. 20 (II), is formed on the donor 1 in the following manner:

In this example, a toner layer on the donor 1 is uniformly charged to a negative polarity, which is opposite to the polarity of the latent electrostatic image, by the charge injection from the doctor 6. Then the pattern for masking is converted to signals and the signals are applied to the multi-stylus electrode 2. The multi-stylus electrode 2 quenches the toner in the area except an area corresponding to the pattern for masking, in accordance with the applied signals. Thus, the pattern for masking is formed in the layer of the toner T on the donor 1, in the form of a negatively charged toner pattern.

The toner layer having the charge distribution is superimposed on the surface of the latent image bearing member 100 on which a latent electrostatic image is formed. Now, it is supposed that the donor 1 on which the toner layer is formed is a development apparatus for developing the latent electrostatic image. In the development apparatus, only the negatively charged toner has a development function and the thus charged toner is distributed in accordance with a masking pattern. Therefore, of the latent electrostatic image, only a portion of the latent electrostatic image overlapping the masking pattern is developed and made visible, so that a mirror image of a visible pattern as shown in FIG. 20 (III) is obtained on the latent image bearing member 100. A development bias voltage for image transfer is applied in the same manner as that of the application of the bias development voltage in the conventional electrophotography, whereby if the pattern on the latent image bearing member 100 has an image density gradation, development is performed without impairing the gradation.

The toner image obtained on the latent image bearing member 100 is transferred and then fixed to the recording sheet S in the same manner as that in the conventional electrophotographic process.

So far, the masking process has been explained. As the modified types of the masking process, a soft masking method and an erasing method will now be explained.

The soft masking method is performed in the following manner: In the afore-mentioned masking process, the toner T on the donor 1 is uniformly charged to a negative polarity by the doctor 6 and is then selectively quenched by the multi-stylus electrode 2. In contrast with this, in the soft masking process, the quenching of positive charges to be injected for the selective quenching by the multi-stylus electrode 2 is decreased in comparison with the case of the masking process, so that part of the electric charges held on the toner T is quenched. In other words, after the charge quenching is performed by the multi-stylus electrode 2, the toner T on the donor 1 is charged to a negative polarity in two grades. More specifically, in the portion corresponding to the pattern for masking, the toner is strongly charged, while in the other portion, the toner T is weakly charged.

Thus, when a visible image pattern is obtained on the recording sheet S by developing the latent electrostatic image on the latent image bearing member 100, an image with a high image density is obtained in the portion corresponding to the pattern for masking and in the other portions, an image with a low image density is obtained. In this case, the pattern given in the form of the latent electrostatic image is modified so as to be corrected by the charge pattern of the toner on the donor 1 and then made visible.

Next, the erasing method will be explained. This method can solve various problems which frequently occur in the conventional electrophotographic process.

When an original smaller than an effective copying area is copied and a recording sheet is larger than the original, the background of the copy is apt to smear in the shape of a frame. In such a case, the smearing of the background can be removed by designating the area of the original as a pattern for masking, utilizing the above-mentioned masking method. This sort of operation is called the erasing method.

Figure 22:
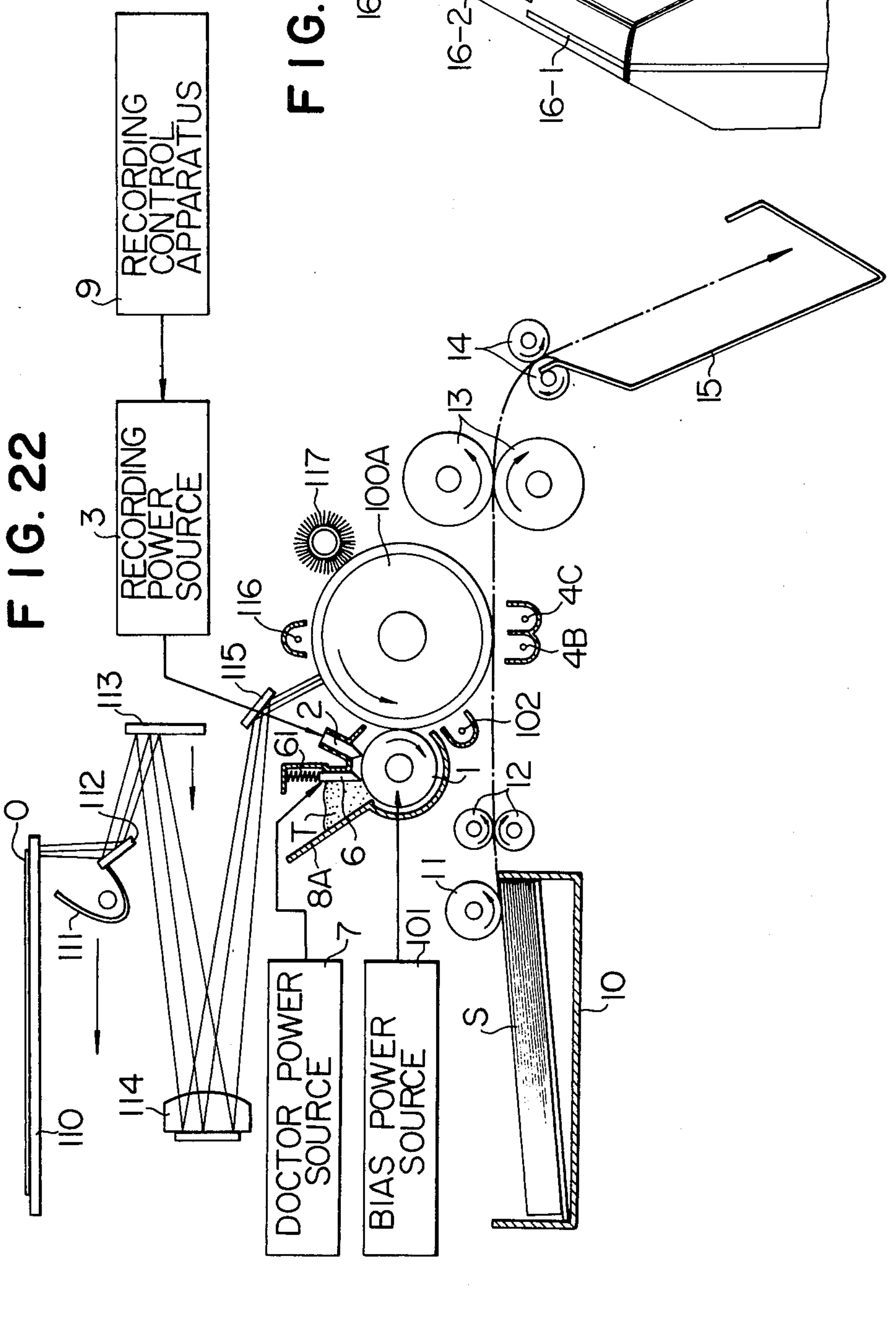
FIG. 22 shows diagrammatically a main portion of an apparatus for carrying out the LIST recording method, which is capable of performing the operations of format synthesis, superpose and masking.

Referring to FIG. 22, there is shown an apparatus capable of performing each process of the previously mentioned format synthesis method, the superpose method and the masking method. In FIG. 22, the same reference numerals are employed as those in FIGS. 4 and 15, so long as there is no risk of misunderstanding.

In FIG. 22, symbol O represents an original, reference numeral 110 represents a contact glass, reference numeral 111 an illumination system, reference numerals 112, 113 and 115 reflectors, and reference numeral 114 an inmirror lens. Reference numeral 100A represents a photoconductor which serves as a latent image bearing member, reference numeral 116 a charger, and reference numeral 117 a cleaning apparatus. Reference numeral 8A represents a hopper, reference numeral 4B an image transfer charger, and reference numeral 4C a sheet separation charger.

The donor 1, doctor 6 and multi-stylus electrode 2 are the same as those in FIG. 4. The employed toner A is non-magnetic and its volume resistivity is $10^{14}$ ohm-cm or higher.

First, how to carry out the format synthesis method using this apparatus will be explained. In this case, the original O has a format image as shown in FIG. 14 (I), for example. The original O is placed on the contact glass 110. For recording, the original O is illuminated slit-wise by the illumination system 111. The illumination slit is arranged in a manner such that its longitudinal direction is normal to the plane of FIG. 22. The illumination system 111 is moved in the direction of the arrow integrally with the reflector 112 at a predetermined speed so as to scan the original O while illuminating the original O. The reflector 112 reflects light reflected from the original O in the direction of the reflector 113. The reflector 113 is moved at half the speed of the reflector 112 in the direction of the arrow, while reflecting a ray of light incident thereupon in the direction of the in-mirror lens 114, so that the length of the optical path from the illuminated portion of the original O to the in-mirror lens 114 is kept constant. A ray of light coming from the in-mirror lens 114 is reflected from the reflector 115 and projected upon the photoconductor 100A and forms the image of the illuminated portion of the original O slit-wise on the peripheral surface of the photoconductor 100A by the image formation function of the in-mirror lens 114. The photoconductor 100A which is formed drum-like is rotated in the direction of the arrow, whose peripheral speed is identical to the scanning speed of the original O. The peripheral surface of the photoconductor 100A is charged to a predetermined polarity, for example, to a positive polarity by the charger 116 and when a light image of the original O is projected upon the peripheral surface of the photoconductor 100A, a latent electrostatic image corresponding to the image of the original O, that is, a latent electrostatic image of a format image on the original, is formed on the photoconductor 100A.

In the meantime, an image to be synthesized with the format image, for example, such a pattern as shown in FIG. 14 (II) is converted to pattern signals which are generated in the recording control apparatus 9. The thus generated pattern signals are applied to the multi-stylus electrode 2 through the recording power source 3, so that a charge distribution of toner corresponding to the pattern signals is formed on the donor 1 by the doctor 6 and the multi-stylus electrode 2, taking such steps as shown in FIG. 3. While the recording is performed by the multi-stylus electrode 2, it is preferable that the stylus electrodes, which are not contributing to the recording, be in a floating condition or set at the same potential as that of the doctor 6.

The latent electrostatic image formed on the photoconductor 100A and the toner having the charge distribution on the donor 1 are superimposed in an image transfer portion between the photoconductor 100A and the donor 1, so that the latent electrostatic image is developed by the negatively charged toner, while the positively charged toner distributed on the donor 1 in accordance with the pattern signals is transferred onto the photoconductor 100A by the bias potential applied to the donor 1 from the bias power source 101.

The superimposing position of the pattern of the latent electrostatic image on the photoconductor 100A and of the pattern of the charge distribution of the toner on the donor 1 is adjusted by the recording control apparatus 9 in accordance with a signal obtained by the movement of the reflector 112. When the signal obtained by the movement of the reflector 112 is applied to the recording control apparatus 9, the recording control apparatus 9 finds out the relationship between the position of the latent electrostatic image formed on the photoconductor 100A and the position of the pattern transfer section, namely the position of the donor 1 and the position of the image transfer section of the photoconductor 100A, and then forms a charge distribution of the toner in a manner suitable for the found relationship of the two positions.

The examples of the experimental values of the potential of a latent electrostatic image, the potential applied to the stylus electrode and the potential applied to the donor 1 from the bias power source 101 are as follows: In the case of the format synthesis using the apparatus as shown in FIG. 22, the charging condition and the exposure condition are set so that the potential of the latent image portion on the photoconductor 100A is +600 V and the potential of the background portion is +200 V. The conductive base member of the photoconductor 100A is grounded.

In the meantime, +400 V of potential is applied to the donor 1 from the bias power source 101. To the doctor 6 is applied +150 V of the potential from the doctor power source 7 and to the stylus electrodes of the multi-stylus electrode 2 is applied +650 V of the potential.

The toner image obtained by synthesizing the patterns on the surface of the photoconductor 100A charged again by the precharger 102 and is then moved to an image transfer section.

The recording sheet S is fed from the cassette 10 by the sheet feed roller 11 and the leading edge of the sheet S is set in a proper position by the register rollers 12 and is caused to stand by.

The register rollers 12 transport the recording sheet S into the image transfer section between the photoconductor 100A and the image transfer charger 4B in synchronism with the movement of the toner image on the photoconductor 100A.

The image transfer charger 4B applies charges to the back side of the sheet S and charges the sheet S to a polarity opposite to the polarity of the toner image. The toner image is transferred to the surface of the recording sheet S by the electric force generated in the sheet S. The sheet S is then separated from the photoconductor 100A with the assistance of a sheet separation charger 4C and the toner image is fixed to the sheet S by a pair of image fixing rollers 13. Thereafter the sheet S is discharged onto the tray 15 by the sheet discharge rollers 14.

After the transfer of the toner image, the residual charges on the photoconductor 100A are quenched by a quenching device (not shown) and then residual toner on the photoconductor 100A is cleaned by the cleaning apparatus 117.

The above-mentioned process can also be applied to the superpose method. More specifically, as one of the patterns to be superposed, the original O is used and a latent electrostatic image is formed on the photoconductor 100A. The other pattern is generated as a pattern signal in the recording control apparatus 9, so that a charge pattern of toner corresponding to the pattern signal is formed on the donor 1.

In the case of the masking method including the soft masking method, as a pattern to be masked, the original O is used and a latent electrostatic image is formed on the photoconductor 100A, and a pattern for masking is formed as a charge pattern of toner on the surface of the donor 1. In particular, if the size of the original O itself is designated as the pattern for masking, erasing can be performed. In this case, the apparatus as shown in FIG. 22 is employed as a copier. Generally, in the case of the masking and also in the case of the erasing, the manner of application of the bias voltage is different from that in the format synthesis and superpose methods. Therefore, it is preferable that the apparatus be designed to as to be able to switch the application of bias voltage from that for the format synthesis and superpose modes to that for the masking mode. Furthermore, the ratio of the peripheral speed of the photoconductor 100A to that of the donor 1 and the voltage to be applied to the doctor 6 may differ, depending upon whether the apparatus is used as a copier or for the other purpose with a different specification from that of the copier. Therefore, the apparatus is designed so as to be switched, depending upon each application mode of the apparatus.

Figure 23:
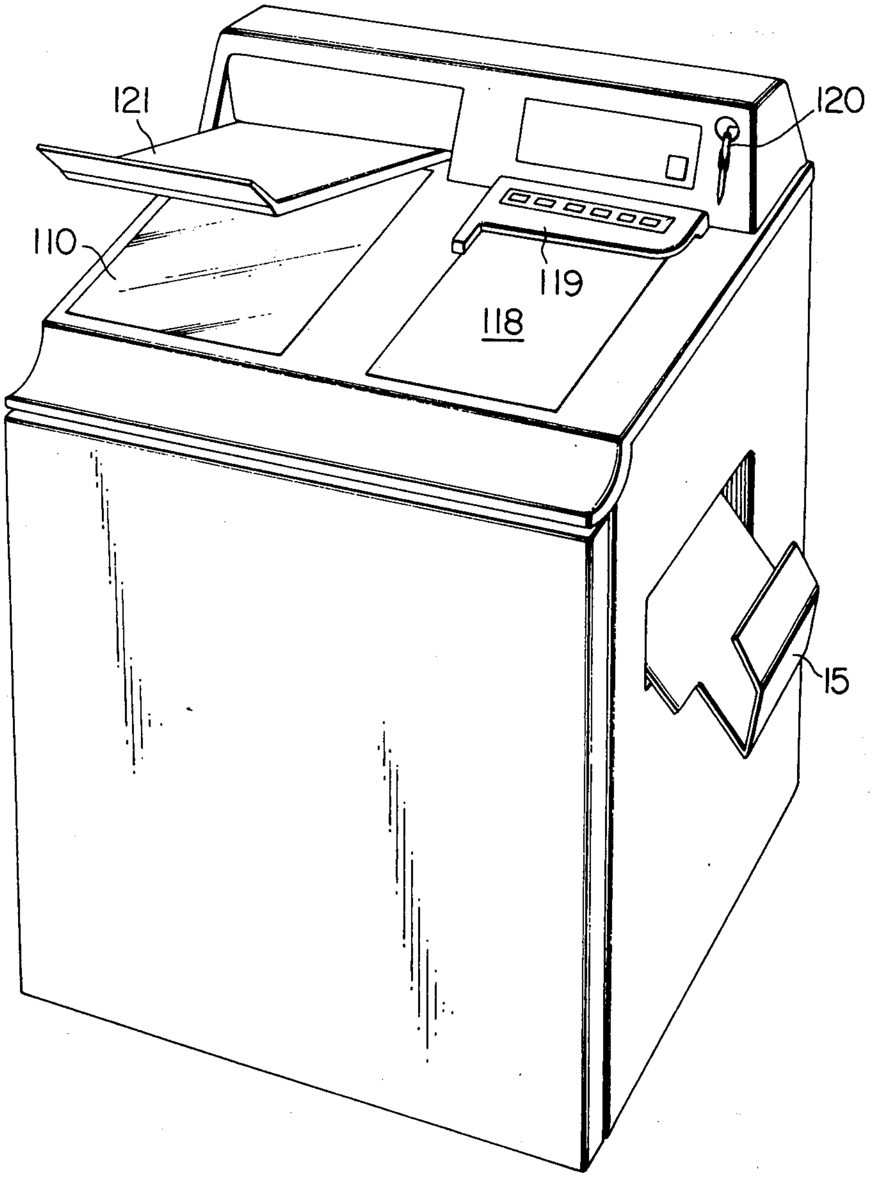
FIG. 23 is a perspective outer view of the apparatus of FIG. 22.

When performing the masking, how to designate an area to be masked, namely the so-called masking area, may become a point to be taken into consideration. For this purpose, a graphic coordinate input methods as is used in computers can be employed. Referring to FIG. 23, an example of the graphic coordinate input method will now be explained.

In FIG. 23, there is schematically shown an outer view of an apparatus as shown in FIG. 22. In FIG. 23, reference numeral 118 represents a masking area designation board. Before placing the original O on the contact glass 110, the original O is placed face-up in a predetermined position of the masking area designation board 118.

Under this condition, only the four corners of the masking area are touched with a pen point of an input pen 120, so that the respective coordinates of the four corners are input and the inside or the outside of an area defined by the four corner points is designated as a masking area by operating a masking operation board 119, so that the thus defined masking area is input.

The input of the respective coordinates can be of an electromagnetic induction type or of the type in which ultrasonic wave is generated between the input pen 120 and the masking area designation board 118 and the ultrasonic wave is measured by a X-coordinate microphone and a Y-coordinate microphone.

After the masking area has been designated in this manner, the original O is placed face-down in a predetermined position of the contact glass 110 and the back side of the original O is held by an original pressure plate 120. Then the apparatus is actuated and the above-mentioned masking process is conducted.

Figure 24:
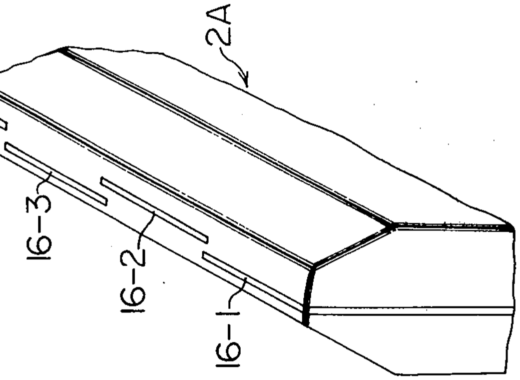
FIG. 24 is a partial perspective view of an electrode which is exclusively used in the masking operation.

In the method mentioned above, the multi-stylus electrode 2 is employed when the masking is performed. However, usually the masking area is square and the position of the area to be masked does not vary so much. Therefore, in order to form a charge distribution of toner corresponding to a masking area, a segmented electrode as shown in FIG. 24 can be employed, in which instead of the stylus electrodes, plate electrodes 16-1, 16-2, 16-3, . . . are embedded in the segmented electrode 2A.

What is claimed is:

1. A recording method comprising the steps of:
bringing a multistylus electrode, to which a pattern signal is applied, into contact with toner having a charge retention property,
forming a charge distribution in said toner on a donor, corresponding to said pattern signal to be applied to said multi-stylus electrode, utilizing the charge injection into said toner by said multi-stylus electrode, and
forming said charge distribution into a visible pattern, wherein said charge distribution of said toner on said donor is formed by toner charged by said multi-stylus electrode, utilizing the charge injection of said multi-stylus electrode, and by uncharged toner, and said visible pattern is obtained on a recording sheet by selectively transferring said charged toner electrostatically to said recording sheet and fixing the same to said recording sheet.

2. A recording method comprising the steps of:
bringing a multistylus electrode, to which a pattern signal is applied, into contact with toner having a charge retention property,
forming a charge distribution in said toner on a donor, corresponding to said pattern signal to be applied to said multi-stylus electrode, utilizing the charge injection into said toner by said multi-stylus electrode, and
forming said charge distribution into a visible pattern, wherein said charge distribution of said toner on said donor is formed by charging toner selectively by said multi-stylus electrode, utilizing the charge injection of said multi-stylus electrode, and said visible pattern is obtained on a recording sheet by selectively transferring the uncharged toner electrostatically to said recording sheet and fixing the same to said recording sheet.

3. A recording method comprising the steps of:
bringing a multistylus electrode, to which a pattern signal is applied, into contact with toner having a charge retention property,
forming a charge distributon in said toner on a donor, corresponding to said pattern signal to be applied to said multi-stylus electrode, utilizing the charge injection into said toner by said multi-stylus electrode, and
forming said charge distribution into a visible pattern, wherein said charge distribution of said toner on said donor is formed by the distribution of oppositely charged toner, and said visible pattern is obtained by selectively transferring the toner of a desired polarity electrostatically to a recording sheet and fixing the same to said recording sheet.

4. A recording method as in claim 3, wherein said charge distribution of said toner on said donor is formed by a uniform charging to a predetermined polarity by charge injection using a doctor, triboelectric charging or corona charging, and by a successive selective reverse charging by charge injection using said multistylus electrode.

5. A recording method as in claim 3, wherein said charge distribution of said toner on said donor is formed by a selective injection of charges of mutually opposite polarities preformed by said multi-stylus electrode.

6. A recording method as in any of claims 1, 2 and 3, said recording sheet being plain paper.

7. A recording method comprising the steps of:
bringing a multi-stylus electrode, to which a pattern signal is applied, into contact with toner having a charge retention property,
forming a charge distribution in said toner on a donor, corresponding to said pattern signal to be applied to said multi-stylus electrode, utilizing the charge injection into said toner by said multi-stylus electrode, bringing the surface of a latent electrostatic image bearing member, on which a latent electrostatic image has been formed, into contact with said toner having said charge distribution corresponding to said pattern signal, and
obtaining a visible pattern modified by said pattern signal on said latent electrostatic image bearing member.

8. A recording method as in claim 7, wherein said latent image bearing member is of a dielectric type comprising a dielectric layer formed on an electrically conductive base member and said latent electrostatic image is formed by selective positional charging of the surface of said latent image bearing member.

9. A recording method as in claim 7, wherein said latent image bearing member is a photoconductor and said latent electrostatic image is formed by charging and exposing said photoconductor.

10. A recording method as in claim 7, wherein said modified visible pattern obtained on the surface of said latent image bearing member is electrostatically transferred to a recording sheet, such as plain paper, and fixed to said recording sheet.

11. A recording method as in claim 7, wherein said latent image bearing member is sheet-like and said modified visible pattern obtained on the surface of said latent image bearing member is fixed to said latent image bearing member.

12. A recording method as in any of claims 7 to 11, said charge distribution of said toner on said donor and said latent electrostatic image on said latent image bearing member are both graphic patterns, and said modified visible pattern is a pattern formed by modifying said graphic patterns mutually and additionally to each other or in such a manner of correcting each other.

13. A recording method as in any of claims 7 to 11, wherein said latent electrostatic image on said latent image bearing member is a graphic pattern and said charge distribution of said toner is a pattern of a masking area.

14. A recording method as in claim 13, wherein said latent image bearing member is a photoconductor and said latent electrostatic image corresponds to an original to be copied and said pattern of said masking area is an original size pattern of said original.

15. A recording method as in any of claims 1, 2, 3 or 7 said toner having a resistivity of at least $10^{12}$ Ωcm.

16. A recording method as in any of claims 1, 2, 3 or 7 said donor having a conductive surface in contact with said toner.

17. A recording apparatus comprising:
a donor which is formed roller-like and which is rotated in a predetermined direction at a predetermined speed, at least the peripheral surface thereof being not electrically insulating;

a hopper which is disposed above and in proximity to said donor and which supplies powder-like toner to the peripheral portion of said donor;

means for forming a uniform layer of said toner supplied from said hopper on the peripheral surface of said donor;

a multi-stylus electrode which is disposed at a predetermined position and whose end surface with stylus electrodes embedded therein can be brought into contact with the layer of said toner on said donor;

a pattern signal application means comprising a recording control apparatus and a recording electrode, for applying a pattern signal to said multi-stylus electrode;

means for electrostatically transferring said toner on said donor selectively to a recording sheet in accordance with a charge distribution of said toner obtained on said donor;

an image fixing means for fixing a visible pattern obtained on said recording sheet to said recording sheet;

a sheet stocking means for stocking said recording sheet therein; and a sheet transportation means for transporting said recording sheet through a sheet transportation path from said sheet stocking means to a sheet discharge section through an electrostatic image transfer section and an image fixing station.

18. A recording apparatus as in claim 17, wherein said means for forming a uniform layer of said toner on the peripheral surface of said donor comprises said multi-stylus electrode and means for bringing said multi-stylus electrode into pressure contact with said donor.

19. A recording apparatus as in claim 17, wherein said means for forming a uniform layer of said toner on the peripheral surface of said donor comprises a doctor disposed on an inner wall of said hopper and a spring for bringing said doctor into pressure contact with the peripheral surface of said donor.

20. A recording apparatus as in claim 19, wherein said doctor is electrically conductive and a predetermined voltage of direct current is applied to said doctor from a doctor power source and the toner layer formed on said donor by said doctor is uniformly charged by the charge injection of said doctor.

21. A recording apparatus as in any of claims 17 to 20, wherein said donor is an electrically conductive roller and whose peripheral portion is made of an electrically conductive rubber selected from the group consisting of silicone rubber, chloroprene rubber and polyurethane rubber, and said toner is non-magnetic.

22. A recordining apparatus as in claim 21, wherein said means for electrostatically transferring said toner on said donor selectively to said recording sheet is an image transfer roller and said image transfer roller is detachable from said donor by a device comprising a lever, a spring and a solenoid.

23. A recording apparatus as in claim 21, wherein said means for electrostatically transferring said toner on said donor selectively to said recording sheet comprises a pair of chargers for applying corona charges with opposite polarities to both sides of said recording sheet, and a charge power source for applying corona charge voltage to said chargers, and both sides of said recording sheet are charged to opposite polarities by said charger while said recording sheet is transported to said electrostatic image transfer section.

24. A recording apparatus as in claim 21, wherein said means for electrostatically transferring said toner on said donor to said recording sheet comprises a pair of image fixing rollers.

25. A recording apparatus as in claim 21, wherein said sheet stocking means for stocking said recording sheet therein is a cassette in which said recording sheet is stocked.

26. A recording apparatus as in any of claims 17 to 20, wherein said donor is a magnetic roller of a radial flux type and said toner is a magnetic toner.

27. A recording apparatus as in claim 26, wherein said means for electrostatically transferring said toner on said donor selectively to said recording sheet is an image transfer roller and said image transfer roller is detachable from said donor by a device comprising a lever, a spring and a solenoid.

28. A recording apparatus as in claim 26, wherein said means for electrostatically transferring said toner on said donor selectively to said recording sheet comprises a pair of chargers for applying corona charges with opposite polarities to both sides of said recording sheet, and a charge power source for applying corona charge voltage to said chargers, and both sides of said recording sheet are charged to opposite polarities by said charger while said recording sheet is transported to said electrostatic image transfer section.

29. A recording apparatus as in claim 26, wherein said means for electrostatically transferring said toner on said donor to said recording sheet comprises a pair of image fixing rollers.

30. A recording apparatus as in claim 26, wherein said sheet stocking means for stocking said recording sheet therein is a cassette in which said recording sheet is stocked.

31. A recording apparatus as in any of claims 17 to 20, wherein said means for electrostatically transferring said toner on said donor selectively to said recording sheet is an image transfer roller and said image transfer roller is detachable from said donor by a device comprising a lever, a spring and a solenoid.

32. A recording apparatus as in claim 31, wherein said means for electrostatically transferring said toner on said donor to said recording sheet comprises a pair of image fixing rollers.

33. A recording apparatus as in claim 31, wherein said sheet stocking means for stocking said recording sheet therein is a cassette in which said recording sheet is stocked.

34. A recording apparatus as in any of claims 17 to 20, wherein said means for electrostatically transferring said toner on said donor selectively to said recording sheet comprises a pair of chargers for applying corona charges with opposite polarities to both sides of said recording sheet, and a charge power source for applying corona charge voltage to said chargers, and both sides of said recording sheet are charged to opposite polarities by said charger while said recording sheet is transported to said electrostatic image transfer section.

35. A recording apparatus as in claim 34, wherein said means for electrostatically transferring said toner on said donor to recording sheet comprises a pair of image fixing rollers.

36. A recording apparatus as in claim 34, wherein said sheet stocking means for stocking said recording sheet therein is a cassette in which said recording sheet is stocked.

37. A recording apparatus as in any of claims 17 to 20, wherein said means for electrostatically transferring said toner on said donor to said recording sheet comprises a pair of image fixing rollers.

38. A recording apparatus as in claim 37, wherein said sheet stocking means for stocking said recording sheet therein is a cassette in which said recording sheet is stocked.

39. A recording apparatus as in any of claims 17 to 20, wherein said sheet stocking means for stocking said recording sheet therein is a cassette in which said recording sheet is stocked.

40. A recording apparatus as in claim 17, wherein a heater is disposed in said sheet transportation path and plain paper is employed as said recording sheet and at a high humidity, said plain paper is dried by said heater and electrostatic image transfer is then performed to said plain paper.

41. A recording apparatus as in claim 40, wherein said sheet stocking means is a cassette and said heater is disposed above said cassette.

42. A recording apparatus comprising:

a donor which is formed roller-like and which is rotated in a predetermined direction at a predetermined speed, at least the peripheral surface thereof being not electrically insulating;

a hopper which is disposed above and in proximity to said donor and which supplies powder-like toner to the peripheral portion of said donor;

means for forming a uniform layer of said toner supplied from said hopper on the peripheral surface of said donor;

a multi-stylus electrode which is disposed at a predetermined position and whose end surface with stylus electrodes embedded therein can be brought into contact with the layer of said toner on said donor;

a pattern signal application means comprising a recording control apparatus and a recording electrode, for applying a pattern signal to said multi-stylus electrode;

a photoconductor which is formed drum-like and which is rotated in contact with said donor;

a charger for applying charges to said photoconductor;

a contact glass for placing an original thereon;

an exposure optical system for projecting a light image of said original placed on said contact glass to said photoconductor;

a precharger for the polarity of a visible pattern modified by a pattern signal and obtained on said photoconductor to a predetermined polarity;

an image transfer charger for transferring electrostatically said visible pattern to a recording sheet;

an image fixing means for fixing said visible pattern transferred to said recording sheet to said recording sheet;

a cleaning means for cleaning said photoconductor after the transfer of said visible pattern;

a sheet stocking means for stocking said recording sheet therein;

a sheet transportation means for transporting said recording sheet from said sheet stocking means to a sheet discharge section through an image transfer section and an image fixing section; and a bias power source for applying a bias voltage to said donor when necessary.

* * * * *